US011448767B2

(12) United States Patent
Gupta et al.

(10) Patent No.: US 11,448,767 B2
(45) Date of Patent: Sep. 20, 2022

(54) SYSTEMS, METHODS, AND MEDIA FOR ASYNCHRONOUS SINGLE PHOTON DEPTH IMAGING WITH IMPROVED PRECISION IN AMBIENT LIGHT

(71) Applicant: Wisconsin Alumni Research Foundation, Madison, WI (US)

(72) Inventors: Mohit Gupta, Madison, WI (US); Anant Gupta, Madison, WI (US); Atul Ingle, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 748 days.

(21) Appl. No.: 16/434,611

(22) Filed: Jun. 7, 2019

(65) Prior Publication Data

US 2020/0386893 A1 Dec. 10, 2020

(51) Int. Cl.
| | | |
|---|---|---|
| *G01S 17/00* | (2020.01) | |
| *G01S 17/894* | (2020.01) | |
| *G01S 17/10* | (2020.01) | |
| *G01J 1/42* | (2006.01) | |
| *G01S 7/481* | (2006.01) | |
| *G01S 17/89* | (2020.01) | |

(52) U.S. Cl.
CPC .......... *G01S 17/894* (2020.01); *G01J 1/4204* (2013.01); *G01S 7/4816* (2013.01); *G01S 17/10* (2013.01); *G01S 17/89* (2013.01)

(58) Field of Classification Search
CPC .............. G01S 17/00; G01S 7/00; G01J 1/00
See application file for complete search history.

(56) References Cited

U.S. PATENT DOCUMENTS

| | | | | |
|---|---|---|---|---|
| 2012/0153188 A1* | 6/2012 | Barrett | ................... | G01N 33/84 |
| | | | | 250/461.1 |
| 2018/0321363 A1* | 11/2018 | Beer | ..................... | G01S 7/4865 |
| 2019/0250257 A1* | 8/2019 | Finkelstein | ........... | G01S 7/4813 |

OTHER PUBLICATIONS

Beer M., et al. Background light rejection in spad-based lidar sensors by adaptive photon coincidence detection. Sensors, 18(12):4338, Dec. 2018.

Gupta, M. et al. Photon flooded single-photon 3d cameras. arXiv preprint arXiv:1903.08347, 2019.

(Continued)

*Primary Examiner* — Maryam A Nasri
(74) *Attorney, Agent, or Firm* — Quarles & Brady, LLP

(57) ABSTRACT

In accordance with some embodiments, systems, methods, and media for asynchronous single photon depth imaging with improved precision in ambient light conditions are provided. In some embodiments, the system comprises: a light source; a detector configured to detect arrival of individual photons, and enter a dead time after a detection; a processor programmed to: cause the light source to emit pulses toward a scene point at the beginning of light source cycles each corresponding to B time bins; cause the detector to enter an acquisition window at a first time bin position; cause the detector to enter another acquisition window at a shifted time bin position; record photon arrival times; associate each photon arrival time with a time bin; and estimate a depth of the scene point based on a number of photon detection events at each time bin, and a denominator corresponding to each time bin.

21 Claims, 18 Drawing Sheets

(56) References Cited

OTHER PUBLICATIONS

Isbaner, S. et al. Dead-time correction of fluorescence lifetime measurements and fluorescence lifetime imaging. Optics express, 24(9):9429-9445, 2016.

Rapp, J. et al. Dead time compensation for high-flux ranging. arXiv preprint arXiv:1810.11145, 2018.

Reilly D.R. et al. High speed lidar via GHz gated photon detector and locked but unequal optical pulse rates. Optics Express, 22(13):15718, Jun. 2014.

Tosi, A. et al. Fastgated single-photon counting technique widens dynamic range and speeds up acquisition time in time-resolved measurements. Optics Express, 19(11):10735, May 2011.

\* cited by examiner

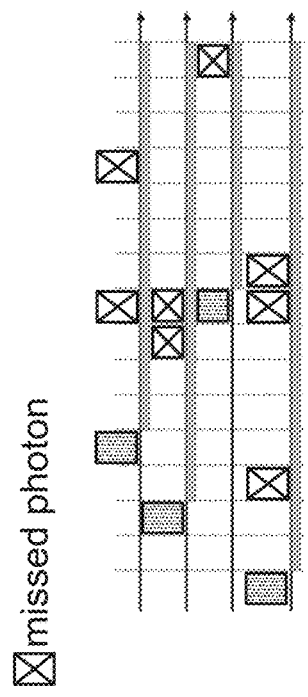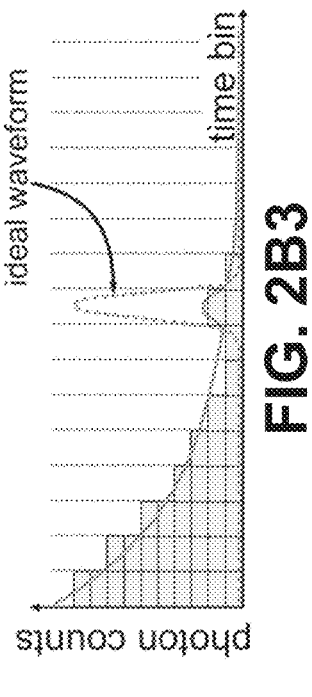
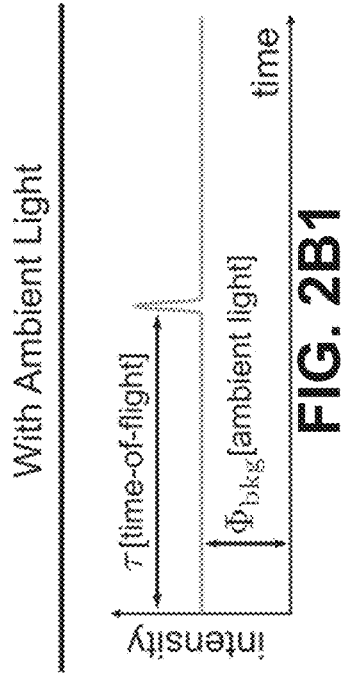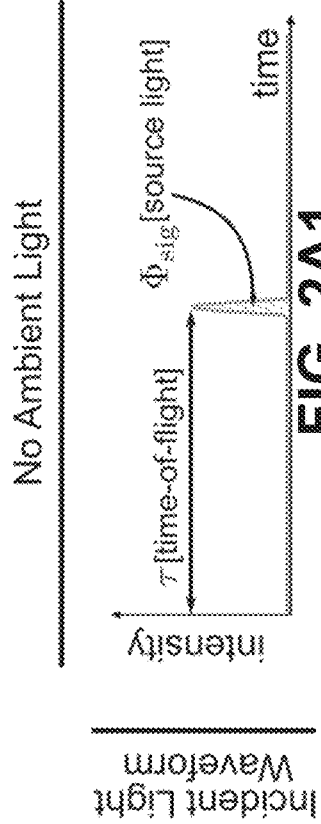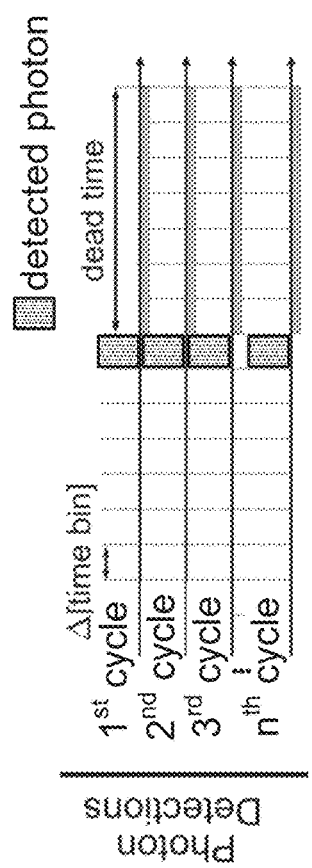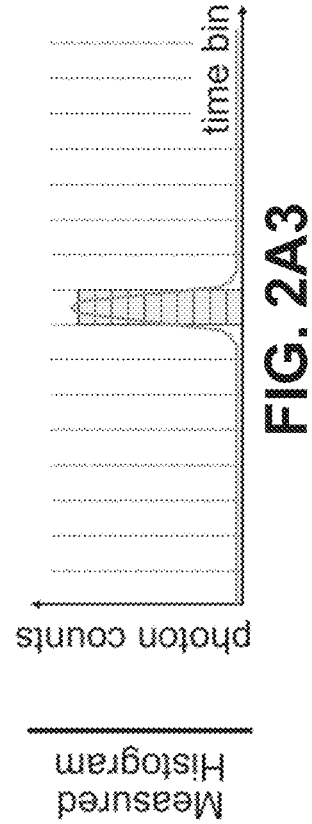
FIG. 2A1  FIG. 2B1
FIG. 2A2  FIG. 2B2
FIG. 2A3  FIG. 2B3

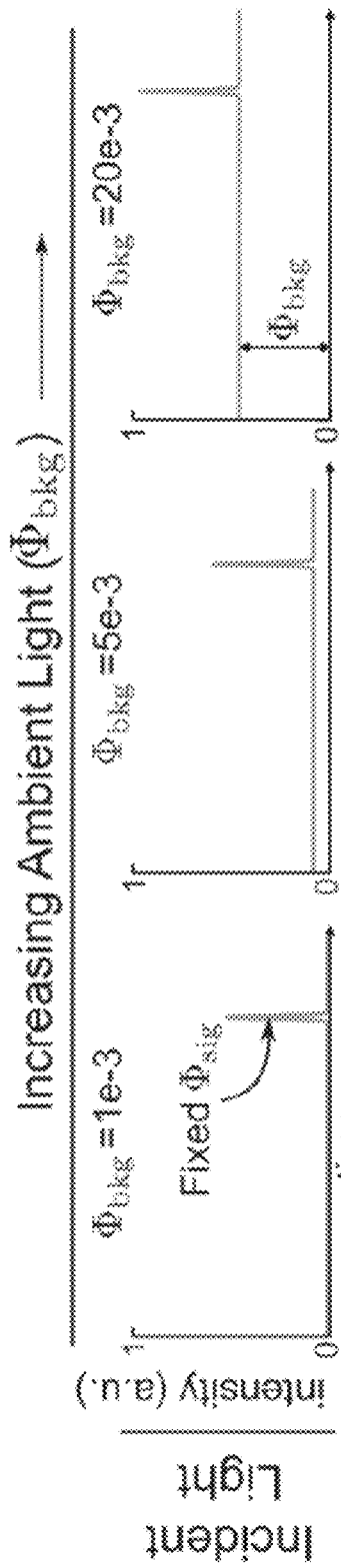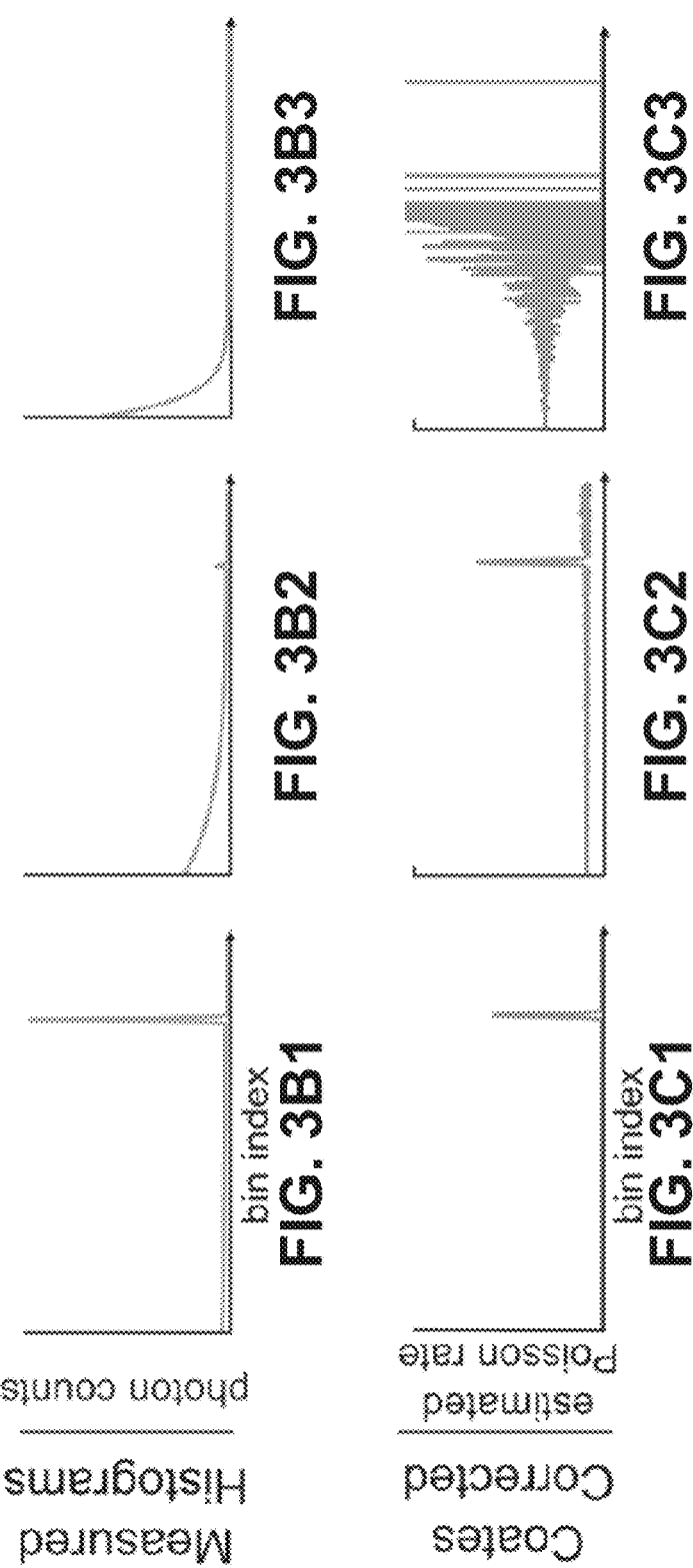

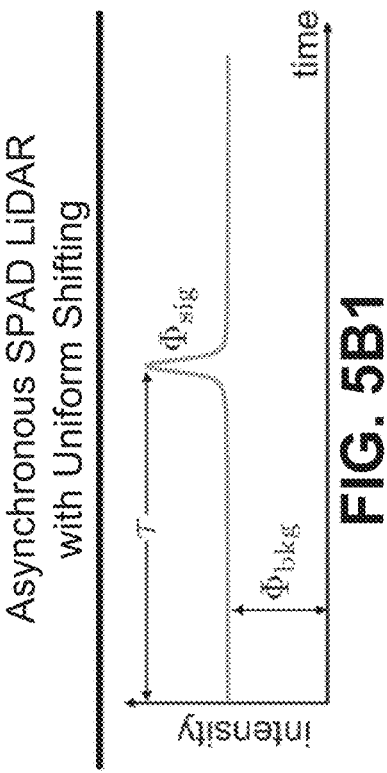
FIG. 5A1
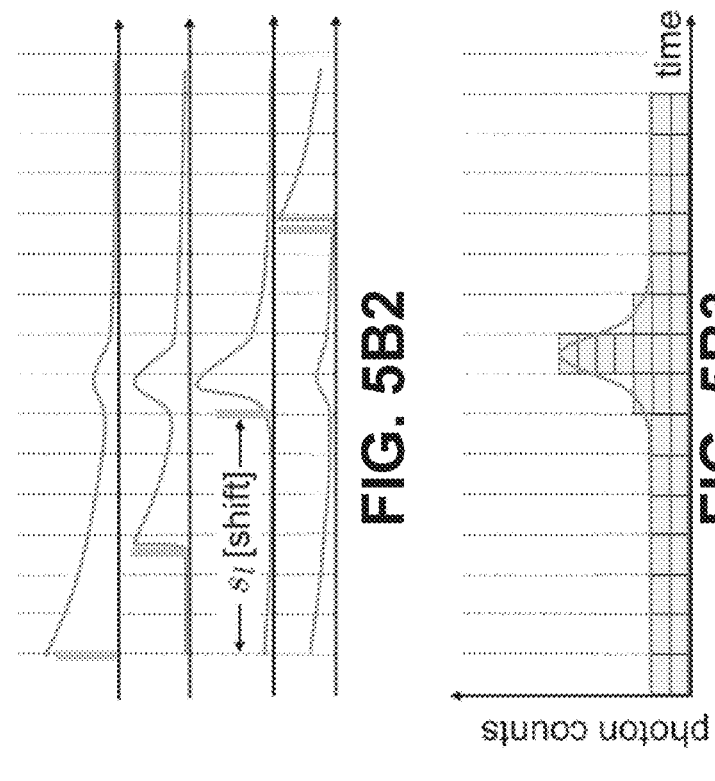
FIG. 5B1
FIG. 5A2
FIG. 5B2
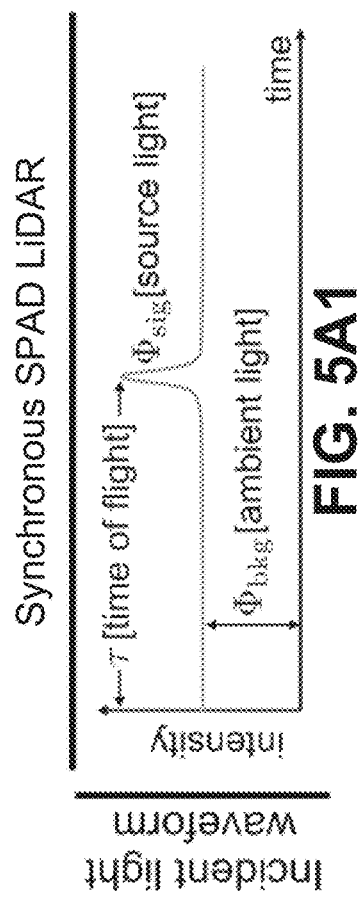
FIG. 5A3
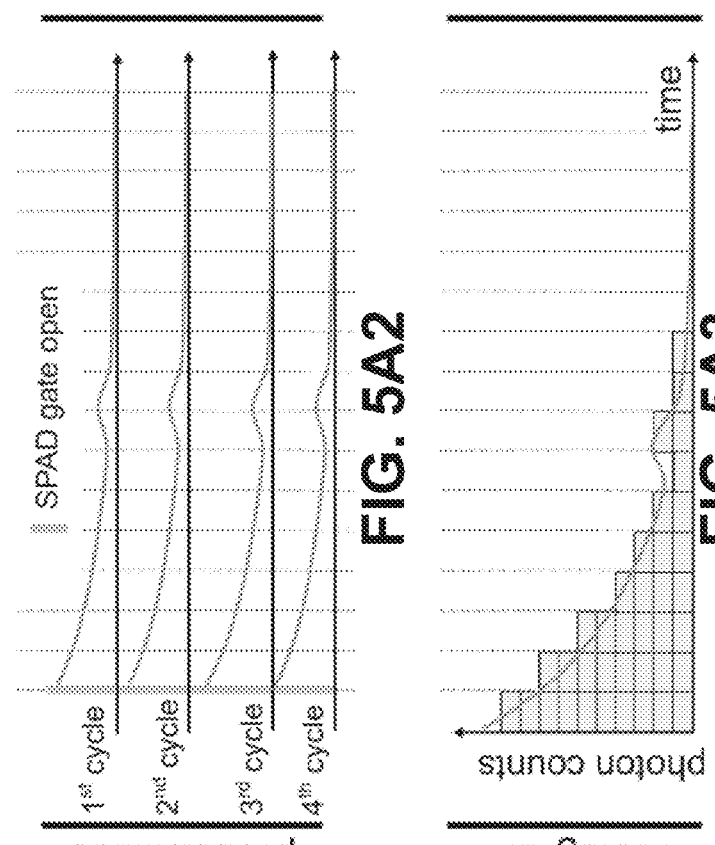
FIG. 5B3

Conventional SPAD LiDAR
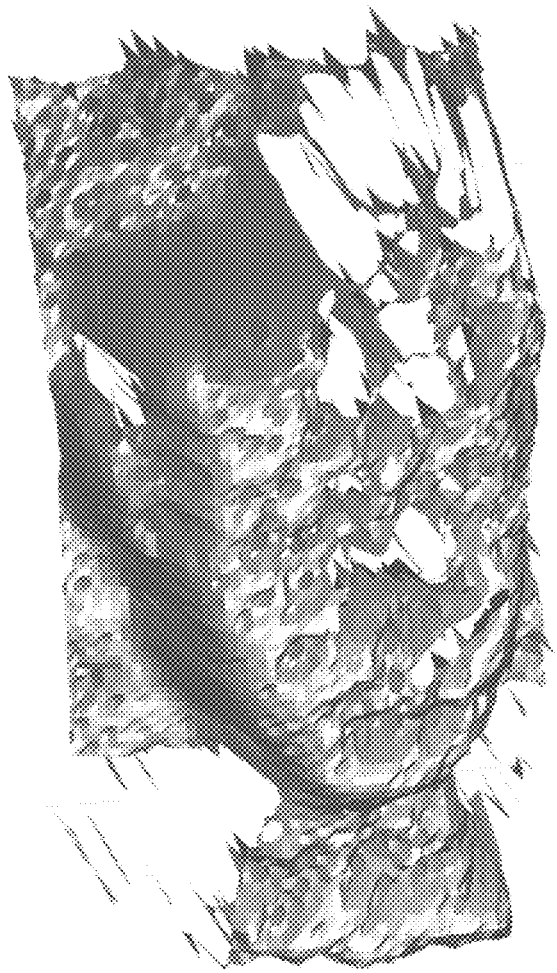
RMSE=6.2 cm
Asynchronous SPAD LiDAR
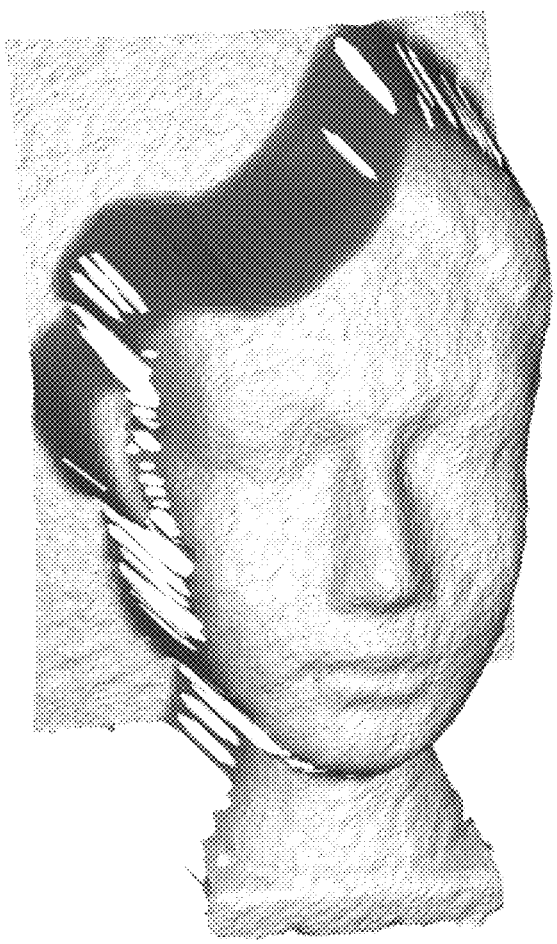
0.65 cm
FIG. 11

SYSTEMS, METHODS, AND MEDIA FOR ASYNCHRONOUS SINGLE PHOTON DEPTH IMAGING WITH IMPROVED PRECISION IN AMBIENT LIGHT

STATEMENT REGARDING FEDERALLY SPONSORED RESEARCH

This invention was made with government support under HR0011-16-C-0025 awarded by the DOD/DARPA and N00014-16-1-2995 awarded by the NAVY/ONR. The government has certain rights in the invention.

CROSS-REFERENCE TO RELATED APPLICATIONS

N/A

BACKGROUND

Detectors that are capable of detecting the arrival time of an individual photon, such as single-photon avalanche diodes (SPADs), can facilitate active vision applications in which a light source is used to interrogate a scene. For example, such single-photon detectors have proposed for use with fluorescence lifetime-imaging microscopy (FLIM), non-line-of-sight (NLOS) imaging, transient imaging, and LiDAR systems. The combination of high sensitivity and high timing resolution has the potential to improve performance of such systems in demanding imaging scenarios, such as in systems having a limited power budget. For example, single-photon detectors can play a role in realizing effective long-range LiDAR for automotive applications (e.g., as sensors for autonomous vehicles) in which a power budget is limited and/or in which a signal strength of the light source is limited due to safety concerns.

FIG. 1A shows an example of a SPAD-based pulsed LiDAR system (sometimes referred to by other names such as Geiger-mode LiDAR and Single Photon LiDAR, which may be implemented using other single-photon detection technologies). The example shown in FIG. 1A includes a laser configured to send out light pulses periodically, and a SPAD that records the arrival time of the first detected photon in each laser period, after which it enters a dead time when the SPAD is inhibited from detecting any further photons. Note that the first detected photon is not necessarily the first photon that is incident on the SPAD, as some photons that are incident will not be detected (the proportion of incident photons detected is sometimes referred to as the quantum efficiency of the detector), and some detections are the result of noise in the detector rather than an incident photon.

In such systems, the first photon detection times in each laser cycle can be collected and used to generate a histogram of the time-of-arrival of the photons that represents the distribution of detections. For example, FIG. 1B shows a histogram representing arrival times of photons in a series of cycles with pile-up caused by ambient light. If the incident flux level is sufficiently low, the histogram can be expected to approximate a scaled version of the received temporal waveform of the reflected laser pulses. In such circumstances, the counts represented by the histogram can be used to estimate scene depths and reflectivity based on the location and height of a local maxima in the data represented by the histogram.

LiDAR that leverages SPAD-type detectors holds considerable promise due to the single-photon sensitivity and extremely high timing resolution, which corresponds to high depth resolution when used in a time-of-flight application. However, the histogram formation procedure can cause severe non-linear distortions when such a system is used with even modest intensity ambient light. A cause of this distortion is the dead time of the SPADs, which causes the SPAD to behave differently based on the flux incident on the detector. For example, when incident flux is high, whether a photon that is incident on the SPAD is detected is dependent on not only the quantum efficiency of the detector, but is also dependent on the detection of a previous photon. In the more particular example, in a SPAD-based LiDAR with a high incident flux on the SPAD due to ambient light, a photon from the ambient light source is much more likely to be the first photon detected by the SPAD than a photon from the laser source of the LiDAR. This leads to nonlinearities in the image formation model, as the measured histogram skews towards earlier time bins. This distortion, sometimes referred to as "pile-up," becomes more severe as the amount of ambient light incident on the SPAD increases, and consequently can lead to large depth errors. This can severely limit the performance of SPAD-based LiDAR that operate in outdoor conditions, such as a power-constrained automotive LiDAR operating on a bright sunny day. Note that in a conventional camera pixel (e.g., a conventional CCD or CMOS-based pixel) and in an avalanche photodiode (APD), the detection of a photon is generally independent of previous photons until the point of saturation. Consequently, in conventional, linear-mode LiDAR systems that use a conventional pixel or an APD, ambient light adds a constant value to the entire waveform.

Various techniques have been proposed for mitigating distortions resulting from pile-up. For example, one proposed technique is to extremely attenuate incident flux such that the image formation model becomes approximately linear. In many LiDAR applications, the signal intensity may be much lower than the ambient light intensity, such that lowering the flux (e.g., by reducing aperture size) incident on the SPAD to the degree required for the image formation model to become linear requires extremely attenuating both the ambient light and the signal light. While this can mitigate distortions, it also typically leads to signal loss due to the attenuation of the signal flux along with the ambient flux, lowering the signal to noise ratio, increasing error of the system, and requiring longer acquisition times to generate reliable depth estimates.

As another example, SPAD-based LiDAR, FLIM and NLOS imaging systems can be used in environments in which the incident flux is in a low enough range that pile-up distortions can be ignored. While this is an effective technique for mitigating distortions resulting from pile-up, many applications involve use of such imaging systems in environments with incident flux (e.g., from ambient sources) that is outside of the range in which pile-up distortions can be ignored.

As yet another example, computational techniques have been proposed that attempt to remove pile-up distortion caused by higher incident flux by computationally inverting the non-linear image formation model. While such techniques can mitigate relatively low levels of pile-up, these techniques are less successful in the presence of high flux levels, and in some cases can lead to both the signal and the noise being amplified noise when the incident flux exceeds a particular level providing little to no benefit.

As still another example, pile-up can be suppressed by modifying detector hardware, for instance, by using multiple SPADs per pixel connected to a single time correlated single photon counting (TCSPC) circuit to distribute the high incident flux over multiple SPADs. In such examples, multi-SPAD schemes with parallel timing units and multi-photon thresholds can be used to detect correlated signal photons and reject ambient light photons that are temporally randomly distributed. While these hardware-based solutions can mitigate some pile-up distortion, they can also increase the expense and complexity of the system.

Accordingly, systems, methods, and media for asynchronous single photon depth imaging with improved precision in ambient light conditions are desirable.

SUMMARY

In accordance with some embodiments of the disclosed subject matter, systems, methods, and media for asynchronous single photon depth imaging with improved precision in ambient light conditions are provided.

In accordance with some embodiments of the disclosed subject matter, a system for determining depths is provided, the system comprising: a light source; a detector configured to detect arrival of individual photons, and in response to a photon detection event, enter a dead time during which the detector is inhibited from detecting arrival of photons; at least one processor that is programmed to: cause the light source to emit a plurality of pulses of light toward a scene point at a plurality of regular time intervals each corresponding to one of a plurality of light source cycles, each light source cycle corresponds to B time bins; cause the detector to enter, at a first time corresponding to a time bin j where $1 \leq j \leq B$, a first acquisition window during which the detector is configured to detect arrival of individual photons; cause the detector to enter, at a second time corresponding to a time bin k where $1 \leq k \leq B$ and $k \neq j$, a second acquisition window during which the detector is configured to detect arrival of individual photons; record a multiplicity of photon arrival times determined using the detector; associate each of the multiplicity of photon arrival times with a time bin i where $1 \leq i \leq B$; and estimate a depth of the scene point based on a number of photon detection events at each time bin, and a denominator corresponding to each time bin.

In some embodiments, the first acquisition window corresponds to m time bins and the second acquisition window corresponds to m time bins.

In some embodiments, the at least one processor is further programmed to: determine an ambient light intensity associated with the scene point; and determine m based at least in part on the ambient light intensity associated with the scene point, a time budget T for acquisition at the scene point, and the dead time.

In some embodiments, the at least one processor is further programmed to: select m such that $$\frac{T}{m\Delta + t_d} \frac{1 - e^{-m\Phi_{bkg}}}{1 - e^{-\Phi_{bkg}}}$$

is maximized, where $t_d$ is the dead time, $\Phi_{bkg}$ represents the ambient light intensity, and $\Delta$ is a bin size.

In some embodiments, the system further comprises further comprises an attenuation element configured to provide a variable intensity attenuation factor, wherein an intensity of light perceived by the detector corresponds to a product of the attenuation factor and an intensity of light perceived by the detector in the absence of attenuation by the attenuation element, and the at least one processor is further programmed to: determine an ambient light intensity associated with the scene point; and select an attenuation factor Y and select m such that $$\arg\max_{m,Y} \frac{T}{(m\Delta + t_d)} \frac{(1 - e^{-Ym\Phi_{bkg}})(1 - e^{-Y\Phi_{sig}})}{e^{Y\Phi_{bkg}} - 1}$$

is maximized, where $t_d$ is the dead time, $\Phi_{bkg}$ represents the ambient light intensity, and $\Delta$ is a bin size.

In some embodiments, the first acquisition window begins at a point that is synchronized with a first pulse corresponding to a first light source cycle of the plurality of light source cycles, and the first acquisition window corresponds to time bins i, $1 \leq i \leq B \ominus m$ where $\ominus$ represents subtraction modulo-B such that for $B < m < 2B$ the first acquisition window corresponds to the B time bins corresponding to a first light source cycle, and m–B time bins of a second light source cycle that immediately follows the first light source cycle), wherein the at least one processor is further programmed to: determine that the detector detected a photon within the first acquisition window; in response to determining that the detector detected a photon within the first acquisition window, inhibit the detector from detecting photons for any remaining time bins of the first acquisition window and a number of time bins substantially corresponding to the dead time that immediately following the first acquisition window substantially corresponding to the dead time.

In some embodiments, the at least one processor is further programmed to: determine, for each time bin i, a denominator $D_i$ where $0 \leq D_i \leq n$, where n is total number of light source cycles, based on the relationship $D_i = \sum_{l=1}^{L} D_{l,i}$ where l denotes a particular detector cycle of a plurality of detector cycles each comprising an acquisition window and time corresponding to the dead time, and L is the total number of detection cycles.

In some embodiments, the second time is randomly determined based on a time at which the detector detects a photon within the first acquisition window.

In some embodiments, the at least one processor is further programmed to: determine, for each time bin i, a denominator $D_i$ where $0 \leq D_i \leq n$, where n is total number of light source cycles, based on the relationship $$D_i = \frac{T}{B\Delta} - \sum_{j'=1}^{t_d/\Delta} N_{i \ominus j'},$$

where T is a time budget for acquisition at the scene point, $\Delta$ is a bin size, $t_d$ is the dead time, $N_i$ is the number of photon detections in time bin i, and j' is an index.

In some embodiments, the system further comprises an attenuation element configured to provide a variable intensity attenuation factor, wherein an intensity of light perceived by the detector corresponds to a product of the attenuation factor and an intensity of light perceived by the detector in the absence of attenuation by the attenuation element, wherein the at least one processor is further programmed to: determine an ambient light intensity associated with the scene point; and select an attenuation factor Y that is expected to improve precision of the depth estimate based on the ambient light intensity, a value indicative of light source intensity received at the detector from the scene point, and the dead time.

In some embodiments the at least one processor is further programmed to: select Y such that $$\frac{Te^{-Y\Phi_{bkg}}(1-e^{-Y\Phi_{sig}})}{B(1+(1-e^{-Y\Phi_{bkg}})t_d)}$$

is maximized, where $t_d$ is the dead time, $\Phi_{bkg}$ represents the ambient light intensity, $\Phi_{sig}$ represents light source intensity received at the detector from the scene point, T is a time budget for acquisition at the scene point, and B is the number of time bins.

In some embodiments, a method for determining depths is provided, the method comprising: causing a light source to emit a plurality of pulses of light toward a scene point at a plurality of regular time intervals each corresponding to one of a plurality of light source cycles, each light source cycle corresponds to B time bins; causing a detector to enter, at a first time corresponding to a time bin j where 1≤j≤B, a first acquisition window during which the detector is configured to detect arrival of individual photons, wherein the detector is configured to detect arrival of individual photons, and in response to a photon detection event, enter a dead time during which the detector is inhibited from detecting arrival of photons; causing the detector to enter, at a second time corresponding to a time bin k where 1≤k≤B and k≠j, a second acquisition window during which the detector is configured to detect arrival of individual photons; recording a multiplicity of photon arrival times determined using the detector; associating each of the multiplicity of photon arrival times with a time bin where 1≤i≤B; and estimating a depth of the scene point based on a number of photon detection events at each time bin, and a denominator corresponding to each time bin.

In accordance with some embodiments of the disclosed subject matter, a non-transitory computer readable medium containing computer executable instructions that, when executed by a processor, cause the processor to perform a method for determining depths is provided, the method comprising: causing a light source to emit a plurality of pulses of light toward a scene point at a plurality of regular time intervals each corresponding to one of a plurality of light source cycles, each light source cycle corresponds to B time bins; causing a detector to enter, at a first time corresponding to a time bin j where 1≤j≤B, a first acquisition window during which the detector is configured to detect arrival of individual photons, wherein the detector is configured to detect arrival of individual photons, and in response to a photon detection event, enter a dead time during which the detector is inhibited from detecting arrival of photons; causing the detector to enter, at a second time corresponding to a time bin k where 1≤k≤B and k≠j, a second acquisition window during which the detector is configured to detect arrival of individual photons; recording a multiplicity of photon arrival times determined using the detector; associating each of the multiplicity of photon arrival times with a time bin i where 1≤i≤B; and estimating a depth of the scene point based on a number of photon detection events at each time bin, and a denominator corresponding to each time bin.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 2A1 shows an example of light impinging on a SPAD-based pulsed LiDAR system over a cycle in the absence of ambient light.

FIG. 2A2 shows an example of photons detected by a SPAD of a synchronous SPAD-based pulsed LiDAR system over various cycles corresponding to the example shown in FIG. 2A1.

FIG. 2A3 shows an example of a histogram based on received photons over n cycles based on the time at which a first photon was detected by the SPAD in each cycle.

FIG. 2B1 shows an example of light impinging on a SPAD-based pulsed LiDAR system over a cycle in the presence of ambient light.

FIG. 2B2 shows an example of photons detected by a SPAD of a synchronous SPAD-based pulsed LiDAR system over various cycles corresponding to the example shown in FIG. 2B1, and photons that subsequently would have been detected by the SPAD in each cycle.

FIG. 2B3 shows an example of a histogram based on received photons over n laser cycles generated from the times at which a first photon was detected by the SPAD in each cycle.

FIG. 3A1 shows an example of light impinging on a SPAD-based pulsed LiDAR system over a cycle in the presence of ambient light at a first (low) intensity.

FIG. 3A2 shows an example of light impinging on a SPAD-based pulsed LiDAR system over a cycle in the presence of ambient light at a second higher intensity.

FIG. 3A3 shows an example of light impinging on a SPAD-based pulsed LiDAR system over a cycle in the presence of ambient light at a third yet higher intensity.

FIG. 3B1 shows an example of a histogram based on photons detected by a synchronous SPAD-based pulsed LiDAR system over various cycles in the presence of ambient light at the first intensity shown in FIG. 3A1.

FIG. 3B2 shows an example of a histogram based on photons detected by a synchronous SPAD-based pulsed LiDAR system over various cycles in the presence of ambient light at the second intensity shown in FIG. 3A2.

FIG. 3B3 shows an example of a histogram based on photons detected by a synchronous SPAD-based pulsed LiDAR system over various cycles in the presence of ambient light at the third intensity shown in FIG. 3A3.

FIG. 3C1 shows an example of a Coates-corrected estimate of the Poisson rate at each time bin based on the histogram in FIG. 3B1.

FIG. 3C2 shows an example of a Coates-corrected estimate of the Poisson rate at each time bin based on the histogram in FIG. 3B2.

FIG. 3C3 shows an example of a Coates-corrected estimate of the Poisson rate at each time bin based on the histogram in FIG. 3B3.

FIG. 5A1 shows another example of light impinging on a SPAD-based pulsed LiDAR system over a cycle in the presence of ambient light.

FIG. 5A2 shows an example of photon detection probabilities for a SPAD receiving the incident waveform shown in FIG. 5A1.

FIG. 5A3 shows another example of a histogram based on received photons over n laser cycles generated from the times at which a first photon was detected by the SPAD in each cycle.

FIG. 5B1 shows yet another example of light impinging on a SPAD-based pulsed LiDAR system over a cycle in the presence of ambient light.

FIG. 5B2 shows an example of photon detection probabilities for a SPAD receiving the incident waveform shown in FIG. 5B1 with a uniform shift applied to the beginning of the SPAD detection cycle between each laser cycle in accordance with some embodiments of the disclosed subject matter.

FIG. 5B3 shows an example of a histogram based on received photons over n laser cycles generated from the times at which a first photon was detected by the SPAD in each uniformly shifted cycle in accordance with some embodiments of the disclosed subject matter.

FIG. 11 shows an example of a surface generated using depth information from a synchronous SPAD-based pulsed LiDAR system, and a surface generated from depth information generated by an asynchronous SPAD-based pulsed LiDAR system implemented in accordance with some embodiments of the disclosed subject matter.

DETAILED DESCRIPTION

Figure 1B:
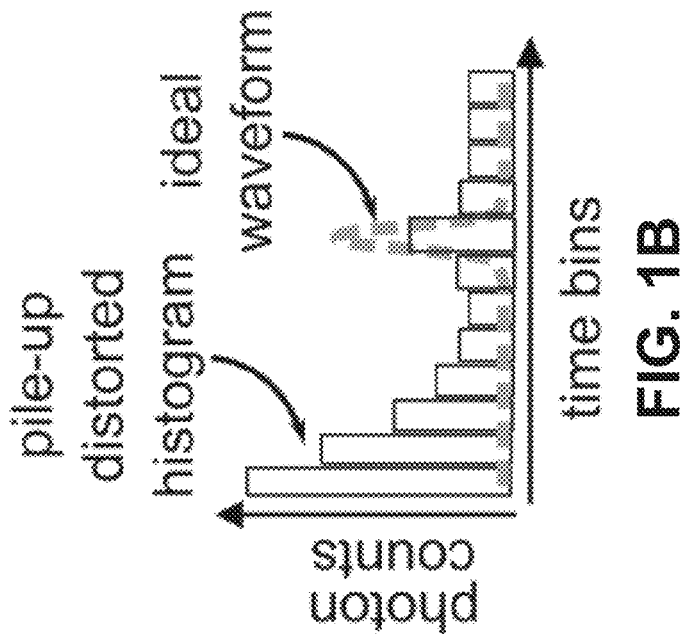
FIG. 1B shows an example of a histogram representing arrival times of photons in a series of cycles with pile-up caused by ambient light.
Figure 1A:
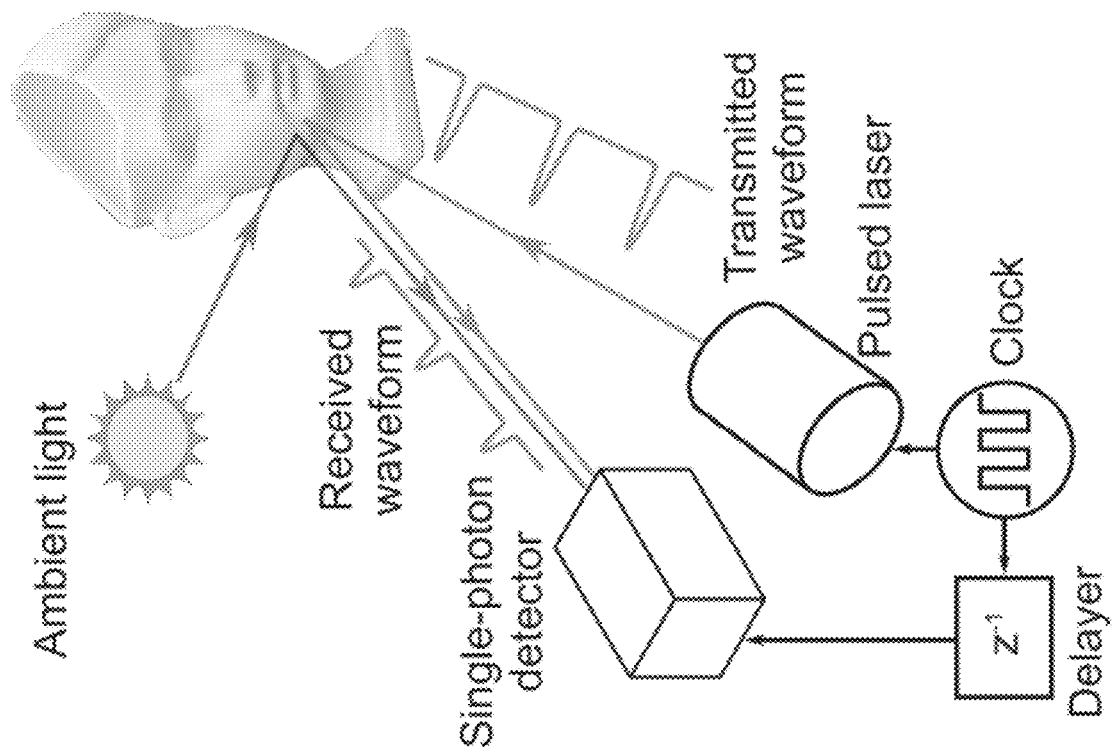
FIG. 1A shows an example of a single photon avalanche diode (SPAD)-based pulsed LiDAR system.

In accordance with various embodiments, mechanisms (which can, for example, include systems, methods, and media) for asynchronous single photon depth imaging with improved precision in ambient light conditions are provided.

In some embodiments, the mechanisms described herein can use asynchronous single-photon 3D imaging techniques to mitigate depth errors caused by pileup in SPAD-based LiDAR. As described below in connection with FIGS. 2A1 to 2B3, the laser and SPAD acquisition cycles are generally synchronized in a conventional SPAD-based LiDAR mode. For example, the SPAD acquisition window is typically aligned with the emission of laser pulses. In some embodiments, the mechanisms described herein can cause the SPAD acquisition window to shift freely and asynchronously with respect to the laser pulses. In such embodiments, such shifts can cause different temporal offsets between laser cycles and SPAD acquisition windows, as described below in connection with FIGS. 5B2, 6, and 7B. In some embodiments, cycling (or otherwise shifting) through a range of offsets across different laser cycles can facilitate detection of photons in later time bins that would otherwise have been masked by detection of earlier-arriving ambient photons. This can distribute the effect of pileup across a range (e.g., all) histogram bins, rather than concentrating the effect of pileup in the bins corresponding to times earlier in the laser cycle. In some embodiments, the mechanisms described herein can mitigate or eliminate the structured distortions caused by synchronous measurements.

In some embodiments, the mechanisms described herein can computationally re-synchronize the asynchronous photon timing measurements with corresponding laser cycles to facilitate calculation of depth information with improved precision. In some embodiments, the mechanisms described herein can use a generalized image formation model and/or a maximum likelihood depth estimator to account for various (e.g., arbitrary) temporal offsets between measurement and laser cycles.

In some embodiments, the mechanisms described herein can cause the SPAD acquisition window to shift deterministically (e.g., uniformly) with respect to the laser cycle. In such embodiments, the mechanisms described herein can cause the SPAD acquisition window to shift by a predetermined amount with respect to the laser cycle. For example, the mechanisms described herein can cause the SPAD to be deactivated or otherwise inhibited from detecting photons after a photon detection within the SPAD acquisition window (if any such detection occurs), and for a predetermined period of time after each SPAD acquisition window has elapsed. In some embodiments, the predetermined period of time can be a fixed period of time (e.g., causing a uniform shift) or a variable period of time (e.g., causing a non-uniform shift).

In some embodiments, the mechanisms described herein can cause the SPAD acquisition window to shift randomly with respect to the laser cycle based on any suitable event. For example, the mechanisms described herein can cause the SPAD to enter a new SPAD acquisition window after a dead time has elapsed after the SPAD detects a photon. In such an example, the new SPAD acquisition window can begin at an arbitrary time within a laser cycle, and can remain open until the SPAD detects a photon. In such an example, randomness in photon arrival times at the SPAD can cause the shifts to be stochastically distributed across the bins corresponding to the laser cycle.

In some embodiments, the mechanisms described herein can be implemented with relatively minor modifications to existing synchronous LiDAR systems, while achieving considerable improvements in depth accuracy (e.g., as described below in connection with FIGS. 11 to 17B). Additionally, in some embodiments, the mechanisms described herein can use relatively simple, computationally efficient closed-form depth estimators to determine depth values based on asynchronous SPAD-based LiDAR data.

As described above in connection with FIGS. 1A and 1B, conventional SPAD-based pulsed LiDAR systems include a laser source configured to transmit periodic short pulses of light toward a scene point, and a co-located SPAD detector which is configured to observe the reflected light. An idealized laser pulse in such a system can be modeled as a Dirac delta function $\tilde{\delta}(t)$. If d is used to represent the distance of the scene point from the sensor, and $\tilde{\tau}=2d/c$ is the round trip time-of-flight for a light pulse from the source to the scene and back to the detector, the time-varying photon flux incident on the SPAD sensor can be represented as:

$$\Phi(t) = \tilde{\Phi}_{sig}\tilde{\delta}(t-\tilde{\tau}) + \tilde{\Phi}_{bkg}, \quad (1)$$

where $\tilde{\Phi}_{sig}$ is a signal component of the received wave-form, which can account for the laser source power, light fall-off, scene brightness and bidirectional reflectance distribution function (BRDF). $\tilde{\Phi}_{bkg}$ can denote a background component, which can be assumed to be a constant due to ambient light. Since SPADs have a finite time resolution (e.g., a few tens of picoseconds), a discretized version of the continuous waveform in EQ. (1) using uniformly spaced time bins of size $\Delta$ can be used to represent the time-varying photon flux. If $M_i$ is used to represent the number of photons incident on the SPAD in the $i^{th}$ time bin, $M_i$ can be expected to follow a Poisson distribution due to arrival statistics of photons. The mean of the Poisson distribution, $\mathbb{E}[M_i]$ E[Mi], which can represent the average number $r_i$ of photons incident in the $i^{th}$ bin, can be represented as:

$$r_i = \Phi_{sig}\delta_{i,\tau} + \Phi_{bkg}. \quad (2)$$

Here, $\delta_{i,j}$ is the Kronecker delta, which can be defined as $\delta_{i,j}=1$ for $i=j$ and 0 otherwise. $\Phi_{sig}$ is the mean number of signal photons received per bin, and $\Phi_{bkg}$ is the (undesirable) background and dark count photon flux per bin. If B is used to represent the total number of time bins, vector of values $(r_1, r_2, \ldots, r_B)$ can be defined as an ideal incident waveform.

In general, SPAD-based LiDAR systems can operate using TCSPC techniques. This can involve illuminating a scene point with a periodic train of laser pulses. Each period starting with a laser pulse can be referred to as a laser cycle. FIG. 2A1 shows an example of light that impinges on a SPAD-based pulsed LiDAR system over a cycle in the absence of ambient light. A cycle can begin at the vertical axis of FIG. 2A1, and the returning light that is incident on the SPAD-based LiDAR system can be a scaled version of the pulse that was emitted by the source that arrives at a time within the cycle that corresponds to a particular scene depth. FIG. 2B1 shows an example of light impinging on a SPAD-based pulsed LiDAR system over a cycle in the presence of ambient light. A cycle can begin at the vertical axis of FIG. 2B1, and the returning light that is incident on the SPAD-based LiDAR system can be a scaled version of the pulse that was emitted by the source with a constant component corresponding to $\Phi_{bkg}$, where the pulse arrives at a time within the cycle that corresponds to a particular scene depth.

In some SPAD-based LiDAR systems the SPAD is configured to detect only the first incident photon in each cycle, after which the SPAD enters a dead time (e.g., of 100 nanoseconds or more), during which it is inhibited from detecting photons. FIG. 2A2 shows an example of photons detected by a SPAD of a SPAD-based pulsed LiDAR system over various cycles corresponding to the example shown in FIG. 2A1. As shown in FIG. 2A2, in the absence of ambient flux (e.g., with $\Phi_{bkg}$ approximately equal to 0), the first photon detection event recorded by the SPAD can be assumed to correspond to a photon representing the return pulse reflected from the scene point. Note that, although not shown in FIG. 2A2, noise can cause detection events in time bins that do not correspond to the depth of the scene and/or a photon may not be detected at all in some cycles (e.g., none of the photons emitted by the source and reflected by the scene point were detected, which can occur due to the detector having a quantum efficiency less than 1, or for other reasons).

FIG. 2B2 shows an example of photons detected by a SPAD of a SPAD-based pulsed LiDAR system over various cycles corresponding to the example shown in FIG. 2B1, and photons that subsequently would have been detected by the SPAD in each cycle. As shown in FIG. 2B2, in the presence of ambient flux (e.g., with a significant $\Phi_{bkg}$), the first photon detection event recorded by the SPAD generally does not correspond to a photon representing the return pulse reflected from the scene point. Rather, the first photon detected in each cycle is likely to be an ambient light photon that is detected before the time bin corresponding to the depth of the scene point. As shown in FIG. 2B2, in the presence of ambient light many signal photons can be missed due to the earlier detection of an ambient photon.

The time of arrival of the first incident photon in each cycle can be recorded with respect to the start of the most recent cycle, and the arrival times can be used to construct a histogram of first photon arrival times over many laser cycles. FIG. 2A3 shows an example of a histogram based on received photons over n cycles based on the time at which a first photon was detected by the SPAD in each cycle in the absence of ambient light. As shown in FIG. 2A3, the histogram generally corresponds to a time-shifted and scaled version of the light pulse emitted by the source at the beginning of each cycle.

FIG. 2B3 shows an example of a histogram based on received photons over n laser cycles generated from the times at which a first photon was detected by the SPAD in each cycle in the presence of ambient light. As shown in FIG. 2B3, the histogram constructed from the arrival times in the presence of ambient light exhibits a large pile-up near the beginning of the cycle that is much larger than the magnitude of the signal. For example, while a small increase in photon count may be observable in the histogram at the time bin corresponding to the depth of the scene point, the magnitude of the increase is dramatically reduced as compared to the example shown in FIG. 2A3.

If the histogram includes B time bins, the laser repetition period can be represented as being equal to $B\Delta$, which can correspond to an unambiguous depth range of $d_{max}=cB\Delta/2$. As the SPAD only records the first photon in each cycle in the example of FIG. 2B3, a photon is detected in the $i^{th}$ bin only if at least one photon is incident on the SPAD during the $i^{th}$ bin, and, no photons are incident in the preceding bins. The probability $q_i$ that at least one photon is incident during the $i^{th}$ bin can be computed using the Poisson distribution with mean $r_i$.

$$q_i = P(M_i \geq 1) = 1 - e^{-r_i}.$$

Thus, the probability $p_i$ of detecting a photon in the $i^{th}$ bin, in any laser cycle, can be represented as:

$$p_i = q_i \prod_{k=1}^{i-1}(1-q_k) = (1-e^{-r_i})e^{-\sum_{k=1}^{i-1}r_k}. \quad (3)$$

If N represents the total number of laser cycles used for forming a histogram and $N_i$ represents the number of photons detected in the $i^{th}$ histogram bin, the vector $(N_1, N_2, \ldots, N_{B+1})$ of the histogram counts can follow a multinomial distribution that can be represented as:

$$(N_1, N_2, \ldots, N_{B+1}) \sim \text{MULT}(N, (p_1, p_2, \ldots, p_{B+1})), \quad (4)$$

where, for convenience, an additional $(B+1)^{st}$ index is included in the histogram to record the number of cycles with no detected photons. Note that $p_{B+1}=1-\Sigma_{i=1}^{B+1}p_i$ and $N=\Sigma_{i=1}^{B+1}N_i$. EQ. (4) describes a general probabilistic model for the histogram of photon counts acquired by a SPAD-based pulsed LiDAR.

As described above, FIGS. 2A1 to 2A3 show an example of histogram formation in the case of negligible ambient light. In that example, all (e.g., ignoring detections resulting from noise) the photon arrival times can be expected to line up with the location of the peak of the incident waveform. As a result, $r_i=0$ for all the bins except that corresponding to the laser impulse peak as shown in FIG. 2A3. The measured histogram vector $(N_1, N_2, \ldots, N_B)$ for such an example can, on average, be a scaled version of the incident waveform $(r_1, r_2, \ldots, r_B)$. The time-of-flight $\tau$ can then be estimated by locating the bin index with the highest photon counts:

$$\hat{\tau} = \arg \max_{1 \leq i \leq B} N_i, \quad (5)$$

and the scene depth can be estimated as $\hat{d}=c\hat{\tau}\Delta/2$. Note that this assumes a perfect laser impulse with a duration of a single time bin, and ignores SPAD non-idealities such as jitter and afterpulsing noise.

FIGS. 3A1 to 3A3 show examples of light impinging on a SPAD-based pulsed LiDAR system over a cycle in the presence of ambient light at a first (low) intensity, a second higher intensity, and a third yet higher intensity. As shown in FIGS. 3A1 to 3A3, the waveform incident on the SPAD in a pulsed LiDAR system can be modeled as an impulse with a constant vertical shift (e.g., which can be analogized to a DC shift in an electrical signal) corresponding to the amount of ambient light incident on the SPAD. However, due to pile-up effects, the measured histogram does not reliably reproduce this "DC shift" due to the histogram formation procedure that only records the first photon for each laser cycle.

FIGS. 3B1 to 3B3 show examples of histograms based on photons detected by a synchronous SPAD-based pulsed LiDAR system over various cycles in the presence of ambient light at the first intensity, the second intensity, and the third intensity, respectively. As shown in FIGS. 3B1 to 3B3, as the ambient flux increases, the SPAD detects an ambient photon in the earlier histogram bins with increasing probability, resulting in a distortion with an exponentially decaying shape. As shown in FIG. 3B2, the peak due to laser source appears only as a small blip in the exponentially decaying tail of the measured histogram, whereas in FIG. 3B3, the peak due to the laser source is indistinguishable from the tail of the measured histogram. Note that the distortion becomes more prominent as the return signal strength decreases (e.g., for scene points that are farther from the imaging system and/or scene points that are less reflective at the frequency of the source). This distortion can significantly lower the accuracy of depth estimates because the bin corresponding to the true depth no longer receives the maximum number of photons. In the extreme case, the later histogram bins might receive no photons at all, making depth reconstruction at those bins impossible (see, for example, FIG. 3C3).

FIGS. 3C1 to 3C3 show examples of Coates-corrected estimates of the Poisson rate at each time bin based on the histograms in FIGS. 3B1 to 3B3. It is theoretically possible to "undo" the distortion by computationally inverting the exponential nonlinearity of EQ. (3), and an estimate $\hat{r}_i$ of the incident waveform $r_i$ in terms of the measured histogram $N_i$ can be found using the following expression:

$$\hat{r}_i = \ln\left(\frac{N - \sum_{k=1}^{i-1} N_k}{N - \sum_{k=1}^{i-1} N_k - N_i}\right), \quad (6)$$

This technique is sometimes referred to as Coates's correction, and it can be demonstrated that this is the best unbiased estimator of $r_i$ for a given histogram. The depth can then be estimated as $$\hat{\tau} = \arg\max_{1 \le i \le B} \hat{r}_i.$$

Note that although this computational approach can remove distortion, the non-linear mapping from measurements $N_i$ to the estimate $\hat{r}_i$ can significantly amplify measurement noise due to high variance of the estimates at later time bins, as shown in FIGS. 3C2 and 3C3.

Figure 4:
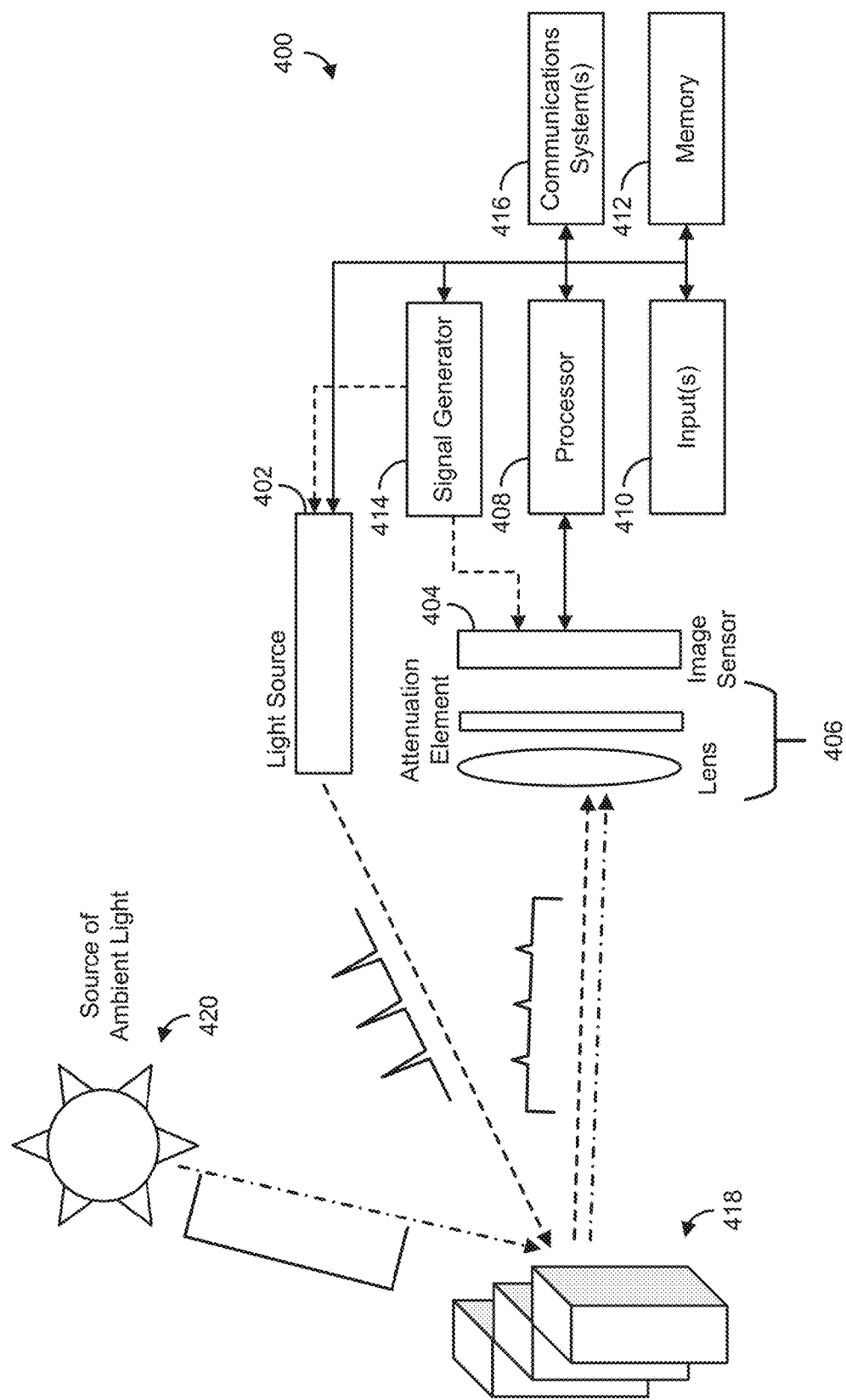
FIG. 4 shows an example of a system for asynchronous single photon depth imaging with improved precision in ambient light conditions in accordance with some embodiments of the disclosed subject matter.

FIG. 4 shows an example 400 of a system for asynchronous single photon depth imaging with improved precision in ambient light conditions in accordance with some embodiments of the disclosed subject matter. As shown, system 400 can include a light source 402; an image sensor 404 (e.g., an area sensor that includes a single detector or an array of detectors); optics 406 (which can include, for example, one or more lenses, one or more attenuation elements such as a filter, a diaphragm, and/or any other suitable optical elements such as a beam splitter, etc.); a processor 408 for controlling operations of system 400 which can include any suitable hardware processor (which can be a central processing unit (CPU), a digital signal processor (DSP), a microcontroller (MCU), a graphics processing unit (GPU), etc.), control circuitry associated with a single photon detector (e.g., a SPAD), or a combination of hardware processors; an input device/display 410 (such as a power button, an activation button, a menu button, a microphone, a touchscreen, a motion sensor, a liquid crystal display, a light emitting diode display, etc., or any suitable combination thereof) for accepting input from a user and/or from the environment, and/or for presenting information (e.g., images, user interfaces, etc.) for consumption by a user; memory 412; a signal generator 414 for generating one or more signals to control operation of light source 402 and/or image sensor 404; and a communication system or systems 416 for facilitating communication between system 400 and other devices, such as a smartphone, a wearable computer, a tablet computer, a laptop computer, a personal computer, a server, an embedded computer (e.g., for controlling an autonomous vehicle, robot, etc.), etc., via a communication link. In some embodiments, memory 412 can store scene depth information, image data, and/or any other suitable data. Memory 412 can include a storage device (e.g., a hard disk, a Blu-ray disc, a Digital Video Disk, RAM, ROM, EEPROM, etc.) for storing a computer program for controlling processor 408. In some embodiments, memory 412 can include instructions for causing processor 408 to execute processes associated with the mechanisms described herein, such as a process described below in connection with FIGS. 8-10.

In some embodiments, light source 402 can be any suitable light source that can be configured to emit modulated light (e.g., as a stream of pulses each approximating Dirac delta function) toward a scene 418 illuminated by an ambient light source 420 in accordance with a signal received from signal generator 416. For example, light source 402 can include one or more laser diodes, one or more lasers, one or more light emitting diodes, and/or any other suitable light source. In some embodiments, light source 402 can emit light at any suitable wavelength. For example, light source 402 can emit ultraviolet light, visible light, near-infrared light, infrared light, etc. In a more particular example, light source 402 can be a coherent light source that emits light in the blue portion of the visible spectrum (e.g., centered at 405 nm), a coherent light source that emits light in the green portion of the visible spectrum (e.g., centered at 532 nm). In another more particular example, light source 402 can be a coherent light source that emits light in the infrared portion of the spectrum (e.g., centered at a wavelength in the near-infrared such as 1060 nm or 1064 nm).

In some embodiments, image sensor 404 can be an image sensor that is implemented at least in part using one or more SPAD detectors (sometimes referred to as a Geiger-mode avalanche diode) and/or one or more other detectors that are configured to detect the arrival time of individual photons. In some embodiments, one or more elements of image sensor 404 can be configured to generate data indicative of the arrival time of photons from the scene via optics 406. For example, in some embodiments, image sensor 404 can be a single SPAD detector. As another example, image sensor 404 can be an array of multiple SPAD detectors. As yet another example, image sensor 404 can be a hybrid array including one or more SPAD detectors and one or more conventional light detectors (e.g., CMOS-based pixels). As still another example, image sensor 404 can be multiple image sensors, such as a first image sensor that includes one or more SPAD detectors that is used to generate depth information and a second image sensor that includes one or more conventional pixels that is used to generate ambient brightness information and/or image data. In such an example, optics can be included in optics 406 (e.g., multiple lenses, a beam splitter, etc.) to direct a portion of incoming light toward the SPAD-based image sensor and another portion toward the conventional image sensor that is used for light metering.

In some embodiments, system 400 can include additional optics. For example, although optics 406 is shown as a single lens and attenuation element, it can be implemented as a compound lens or combination of lenses. Note that although the mechanisms described herein are generally described as using SPAD-based detectors, this is merely an example of a single photon detector that is configured to record the arrival time of a pixel with a time resolution on the order of picoseconds, and other components can be used in place of SPAD detectors. For example, a photomultiplier tube in Geiger mode can be used to detect single photon arrivals.

In some embodiments, optics 406 can include optics for focusing light received from scene 418, one or more narrow bandpass filters centered around the wavelength of light emitted by light source 402, any other suitable optics, and/or any suitable combination thereof. In some embodiments, a single filter can be used for the entire area of image sensor 404 and/or multiple filters can be used that are each associated with a smaller area of image sensor 104 (e.g., with individual pixels or groups of pixels). Additionally, in some embodiments, optics 406 can include one or more optical components configured to attenuate the input flux. For example, in some embodiments, optics 406 can include a neutral density filter in addition to or in lieu of a narrow bandpass filter. As another example, optics 406 can include a diaphragm that can attenuate the amount of input flux that reaches image sensor 404. In some embodiments, one or more attenuation elements can be implemented using elements that can vary the amount of attenuation. For example, a neutral density filter can be implemented with one or more active elements, such as a liquid crystal shutter. As another example, a variable neutral density filter can be implemented with a filter wheel that has a continuously variable attenuation factor. As yet another example, a variable neutral density filter can be implemented with an acousto-optic tunable filter. As still another example, image sensor 404 can include multiple detector elements that are each associated with a different attenuation factor. As a further example, the quantum efficiency of a SPAD detector can be dependent on a bias voltage applied to the SPAD. In such an example, image sensor 404 can include multiple SPAD detectors having a range of bias voltages, and correspondingly different quantum efficiencies. Additionally or alternatively, in such an example, the bias voltage(s) of one or more SPAD detectors in image sensor 404 can be provided by a circuit that can be controlled to programmatically vary the bias voltage to change the quantum efficiency, thereby varying the effective attenuation factor of the detector and hence the detector's photon detection sensitivity.

In some embodiments, system 400 can communicate with a remote device over a network using communication system(s) 414 and a communication link. Additionally or alternatively, system 400 can be included as part of another device, such as a smartphone, a tablet computer, a laptop computer, an autonomous vehicle, a robot, etc. Parts of system 400 can be shared with a device within which system 400 is integrated. For example, if system 400 is integrated with an autonomous vehicle, processor 408 can be a processor of the autonomous vehicle and can be used to control operation of system 400.

In some embodiments, system 400 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as a digital camera, security camera, outdoor monitoring system, a smartphone, a wearable computer, a tablet computer, a personal data assistant (PDA), a personal computer, a laptop computer, a multimedia terminal, a game console, a peripheral for a game counsel or any of the above devices, a special purpose device, etc.

Communications by communication system 414 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between system 100 and another device, such as a network link, a dial-up link, a wireless link, a hard-wired link, any other suitable communication link, or any suitable combination of such links.

It should also be noted that data received through the communication link or any other communication link(s) can be received from any suitable source. In some embodiments, processor 408 can send and receive data through the communication link or any other communication link(s) using, for example, a transmitter, receiver, transmitter/receiver, transceiver, or any other suitable communication device.

FIGS. 5A1 to 5A3 show an example of light impinging on a SPAD-based pulsed LiDAR system over a cycle in the presence of ambient light, corresponding photon detection probabilities for a synchronous SPAD that receives the incident waveform, and a histogram based on received photons over n laser cycles generated from the times at which a first photon was detected by the SPAD in each cycle. As described above in connection with FIGS. 2B1 to 2B3, in the presence of ambient light the photon detection probability tends to be higher near the beginning of the laser cycle, which is illustrated in FIG. 5A2. This can result in a histogram that exhibits pileup near the beginning of the laser cycle as shown in FIG. 5A3.

FIG. 5B1 shows an example of light impinging on a SPAD-based pulsed LiDAR system over a cycle in the presence of ambient light, corresponding photon detection probabilities for a SPAD receiving the incident waveform with a uniform shift applied to the beginning of the SPAD detection cycle for each laser cycle, and a histogram based on received photons over n laser cycles generated from the times at which a first photon was detected by the SPAD in each uniformly shifted cycle in accordance with some embodiments of the disclosed subject matter.

As shown in FIG. 5B2, delaying the start of the SPAD cycle with respect to the start of a laser cycle can increases the probability of receiving a photon at later time bins. As shown in FIGS. 5B and 5B3, cycling through various shifts $s_l$ for different SPAD cycles can ensure that each time bin is close to the start of the SPAD detection cycle in at least a few SPAD cycles. Note that if all possible shifts from bin 0 to bin B−1 is used, the effect of the exponentially decaying pileup due to ambient photons can be expected to be distributed over all histogram bins equally, while returning signal photons from the laser peak add "coherently" (e.g., because the bin location of these photons remains fixed). As a result, the accumulated histogram becomes approximately a linearly scaled replica of the true incident waveform, as shown in FIG. 5B3.

The space of all shifting strategies can be characterized by a shift sequence, $(s_i)_{i=1}^{L}$. A deterministic shift sequence can be a sequence in which all the shifts are fixed a priori, and a uniform shift sequence can be a deterministic shift sequence that uniformly partitions the time interval [0, BΔ). For example, a shift sequence can be referred to as uniform if it is a permutation of the sequence (0, ⌊B/L⌋, ⌊2B/L⌋, . . . , ⌊(L−1)B/L⌋). A stochastic shift sequence can be a sequence in which the shifts are not fixed, but vary based on a stochastic process (e.g., an environmental trigger that happens at random intervals, a signal generator that generators a trigger signal based on a random number generator or pseudo-random number generator).

Figure 6:
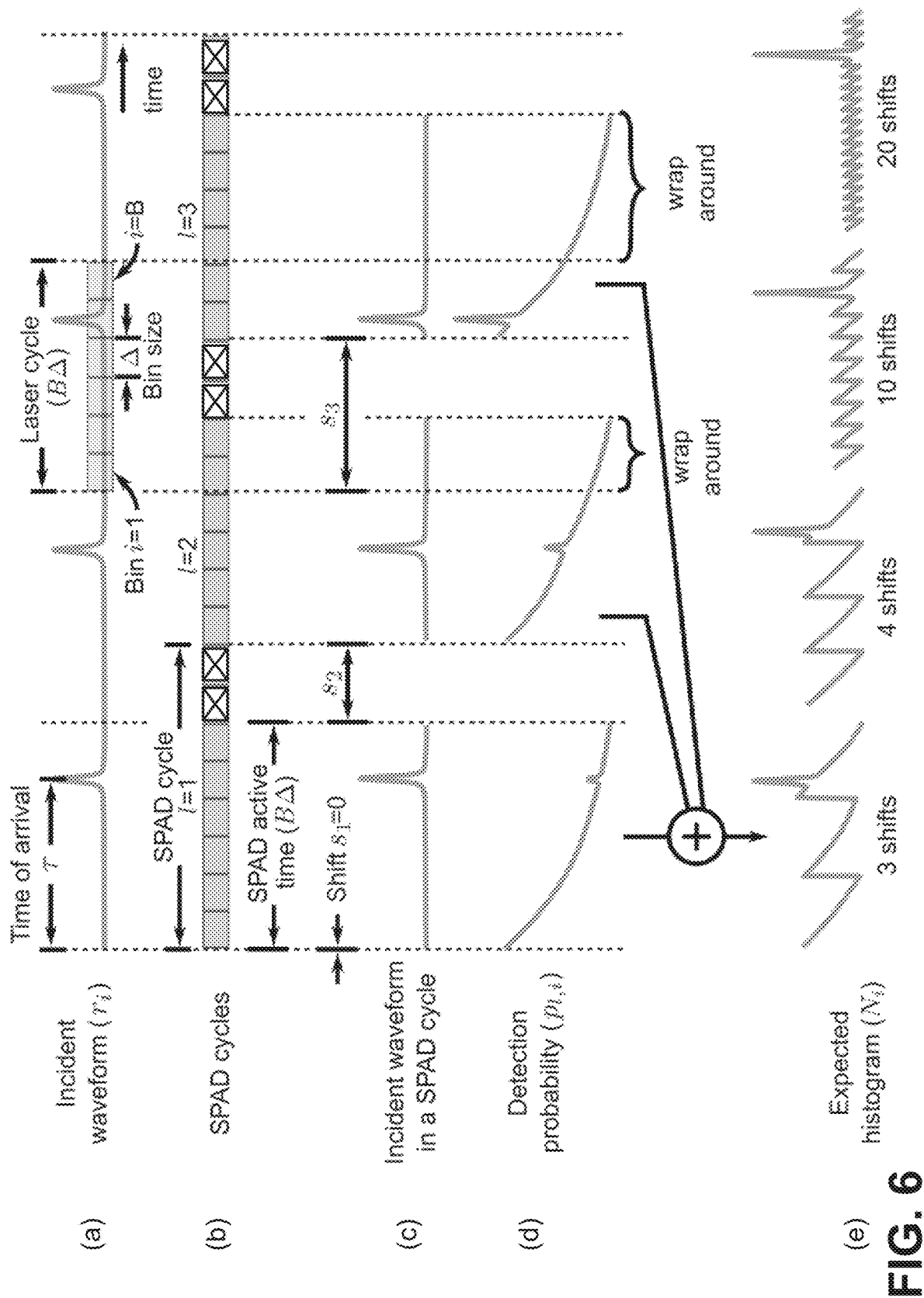
FIG. 6 shows an example depiction of a histogram formation technique based on received photons over n laser cycles generated from the times at which a first photon was detected by the SPAD in each uniformly shifted cycle in accordance with some embodiments of the disclosed subject matter.

FIG. 6 shows an example depiction of a histogram formation technique based on received photons over n laser cycles generated from the times at which a first photon was detected by the SPAD in each uniformly shifted cycle in accordance with some embodiments of the disclosed subject matter. Unlike synchronous acquisition, in some embodiments, in an asynchronous SPAD-based imaging system SPAD operation can be decoupled from the laser cycles by allowing SPAD acquisition windows to have arbitrary start times (e.g., a start time corresponding to any bin) with respect to the laser pulses. In some embodiments, a SPAD cycle can be defined as the duration between two consecutive time instants when the SPAD detector is turned on or otherwise placed into a state in which photons can be detected. In general, the SPAD can be expected to remain inactive during some portion of each SPAD cycle due to its dead time and/or due to a time during which the SPAD is inhibited from detecting photons.

As shown in FIG. 6, each laser cycle can include B time bins which can be used to build a photon count histogram. Note that the bin indices can be defined with respect to the start of the laser cycle. For example, the first time bin can be aligned with the transmission of each laser pulse. For the purposes of describing FIG. 6, it can be assumed that the laser repetition period is $B\Delta = 2z_{max}/c$. This can ensure that a photon detected by the SPAD always corresponds to an unambiguous depth range $[0, z_{max})$. Note that $s_l(0 \leq s_l \leq B-1)$ can denote the bin index at which the SPAD gate is activated during the $l^{th}$ SPAD cycle ($1 \leq l \leq L$). As shown FIG. 6 in rows (a) and (b), the SPAD cycle can extend over consecutive laser cycles. As shown in the example of FIG. 6, the start of the $i^{th}$ SPAD cycle can be at bin index $S_l$ with respect to the most recent laser cycle. Similarly, as shown in FIG. 6 row (c), the returning peak in the incident waveform can shift within the SPAD cycle as the SPAD cycle shifts with respect to the laser cycle.

Due to Poisson statistics, the probability $q_i$ that at least one photon is incident on the SPAD in the $i^{th}$ bin can be represented as:

$$q_i = 1 - e^{-r_i},$$

where $r_i$ can be the incident photon flux waveform described above in connection with EQ. (2). Note that the probability $p_{l,i}$ that the SPAD detects a photon in the $i^{th}$ time bin during the $l^{th}$ SPAD cycle depends on the shift $S_l$, and can be represented as:

$$p_{l,i} = q_i \prod_{j \in J_{l,i}} (1 - q_j) = (1 - e^{-r_i}) e^{-\sum_{j \in J_{l,i}} r_j}, \quad (7)$$

Where $J_{l,i}$ is the set of bin indices between $s_l$ and i in a modulo-B sense, which can be represented as:

$$J_{l,i} = \begin{cases} \{s_l+1, \ldots, \underbrace{B, 1}_{\text{wrap around}}, \ldots, i-1\}, & \text{for } i \leq s_l \\ \{s_l+1, \ldots, i-1\}, & \text{for } i > s_l \end{cases} \quad (8)$$

For example, if B=8 and $s_l$=3, $J_{l,7}$={4,5,6}, and $J_{l,2}$={4,5,6,7,8,1}. In some embodiments, additional (B+1)$^{th}$ bin can be used when calculating a histogram to record the number of cycles where no photons were detected, with corresponding bin probabilities $p_{l,B+1} := 1 - \sum_{i=1}^{B} p_{l,i}$.

In some embodiments, a histogram can be generated using the number of photons detected in each time bin. The number of photons captured in the $i^{th}$ bin over L SPAD cycles can be represented as $N_i$. In some embodiments, the joint distribution of the measured histogram can be represented as $(N_1, N_2, \ldots, N_B, N_{B+1})$, which can be represented using a Poisson-Multinomial Distribution (PMD) as:

$$(N_i)_{i=1}^{B+1} \sim (L, B+1) - PMD((p_{l,i})_{1 \leq l \leq L, 1 \leq i \leq B+1}). \quad (9)$$

The expected number of photon counts $\mathbb{E}[N_i]$ in the $i^{th}$ bin can be represented as $\sum_{l=1}^{L} p_{l,i}$. The PMD is a generalization of the multinomial distribution; if $s_l = 0 \forall l$ (e.g., corresponding to the scheme in a synchronous SPAD-based LiDAR), which can reduce to a multinomial distribution.

In the low incident flux regime (e.g., $r_i \ll 1 \forall i$) the measured histogram can be expected to be, on average, a linearly scaled version of the incident flux: $\mathbb{E}[N_i] \approx L r_i$. However, in high ambient light, the photon detection probability at a specific histogram bin depends on its position with respect to the beginning of the SPAD cycle as described above in connection with EQ. (2) and shown in FIGS. 5B2 and 6. As in a synchronous SPAD-based LiDAR acquisition scheme, histogram bins that are farther away from the start of the SPAD cycle record photons with exponentially smaller probabilities compared to those near the start of the cycle. However, unlike synchronous schemes, the shape of the pileup distortion wraps around at the $B^{th}$ histogram bin, as described above in connection with EQ. (8) and as conceptually shown in FIG. 5B2 and FIG. 6 row (d). Note that the segment that is wrapped around depends on $s_l$ and may vary with each SPAD cycle.

In some embodiments, the effect of pileup can be computationally inverted using the joint distribution of the measured histogram as described above in connection with EQ. (9), and using information that be used to determine the bin locations of photon detections in each SPAD cycle with respect to the laser cycle that began most recently before the photon detection. A maximum likelihood estimator (MLE) of the incident flux waveform $\hat{r}$ can be given by a generalized form of a Coates's estimator, which can be represented as:

$$\hat{r}_i = \ln\left(\frac{D_i}{D_i - N_i}\right). \quad (10)$$

In EQ. (10), $D_i$ can represent a denominator sequence, which can be used as an indicator variable that is 0 if a photon is detected at a bin index in the set $J_{l,i}$ and 1 otherwise. The denominator sequence $(D_i)_{i=1}^{B}$ can be represented as $D_i = \sum_{l=1}^{L} D_{l,i}$. In some embodiments, the waveform estimate $\hat{r}_i$ can be used to estimate the time of flight (e.g., based on the expression $$\hat{\tau} = \arg \max_{1 \leq i \leq B} \hat{r}_i).$$

As described above, a detection in a specific histogram bin prevents subsequent histogram bins that fall within the same SPAD cycle (e.g., within the dead time of the SPAD) from recording a photon detection as photon detections are inhibited. Intuitively, $D_{l,i} = 1$ if in the $l^{th}$ SPAD cycle, the $i^{th}$ histogram bin had an opportunity to detect a photon. Accordingly, $D_i$ can be determined to be equal to the total number of SPAD cycles where the $i^{th}$ bin had an opportunity to detect a photon. In a particular example, if the first bin fell within the dead time in half of the SPAD cycles, the denominator $D_1$ for the first bin would be equal to half of the total SPAD cycles.

The generalized Coates's estimator in EQ. (10) can theoretically invert pileup distortion for asynchronous acquisition in a high ambient light environment with a specific set of shifts $s_l$. However, different asynchronous acquisition schemes can perform differently. In some schemes the non-linear mapping from $N_i$ to the estimate $\hat{\tau}_i$ can amplify measurement noise (e.g., variance in random variables $N_i$), especially for histogram bins where $D_i \approx 0$. For example, if the shifts $S_l$ are kept constant over all SPAD cycles, bins farther from the start of the SPAD cycle are more likely to be prevented from making a measurement due to the exponentially decaying probabilities of photon detection (e.g., as described above in connection with EQ. (7)), which can lead to extremely noisy flux estimates.

In some embodiments, the mechanisms described herein can be used to asynchronous acquire SPAD-based LiDAR data in low signal-to-background ratio (SBR) conditions, where SBR is indicative of the ratio of the average number of source photons (e.g., signal photons from the LiDAR light source) to ambient photons incident in a laser cycle. For example, SBR can be defined as $SBR = \Phi_{sig}/B\Phi_{bkg}$. As described below, a shift sequence that achieves a constant expected denominator sequence can be expected to minimize an upper bound on the probability of depth estimation error. Additionally, as described below, a uniform shift sequence can achieve a constant expected denominator.

The true depth bin can be represented by $\tau$, and $\hat{\tau}$ can represent an estimate obtained using the EQ. (7). In a high ambient flux regime where the total number of incident photons is dominated by ambient photons (e.g., $B\Phi_{bkg} >> B\Phi_{bkg}$ such that $SBR << 1$), an upper bound on the average probability of depth error $\Sigma_{\tau=1}^{B} \mathbb{P}(\hat{\tau} \neq \tau)$ is minimized when the expected denominator sequence is constant for all histogram bins.

Note that, in general, performance is described herein in terms of root-mean-squared error (RMSE), which can also be referred to as $\ell_2$ depth error. In the preceding description, an upper bound on the probability of depth estimation error ($\ell_0$ error) is used as a surrogate for RMSE, which can make mathematical analysis tractable and facilitate derivation of closed form expressions. As described below in connection with simulations and experimental results shown in FIGS. 12-17B, the resulting shifting strategies achieve considerably lower RMSE than a selection of other strategies.

As described above, a uniform shift sequence ensures that each histogram bin is close to the start of the SPAD cycle in an equal number of cycles, which can provide an equal opportunity to each histogram bin to detect photons. This can result in a constant denominator sequence, on average. Unlike synchronous schemes, where later time bins suffer from higher depth errors, a uniform denominator sequence can ensure that depth errors become invariant to the true bin location.

In some embodiments, a uniform shift can be implemented by causing the SPAD cycle to be longer than the laser cycle. For example, the SPAD cycle period shown in FIG. 6 row (b) is slightly longer than the laser cycle, which causes a shift of two bins per laser cycle. In practice, the duration for which the SPAD gate is potentially capable of detecting photons (sometimes referred to as the active time window), can be set equal to the laser cycle period $B\Delta$. After each active time window, the SPAD can be inhibited from detecting photons (e.g., the SPAD gate can be turned off, as illustrated by boxes overlaid with crossing lines in FIG. 6 row (b)) for a duration equal to the dead time $t_d$ of the SPAD detector (irrespective of whether a photon was detected). As a result, the SPAD cycle length can be set equal to $B\Delta + t_d$. This can ensures that the dead time from one SPAD cycle does not extend into the next SPAD cycle when a photon is detected close to the end of the current cycle. The total number of SPAD cycles over a fixed acquisition time, T, can be limited to $L = \lfloor T/B\Delta + t_d \rfloor$.

Since the length of the laser cycle can be represented as $B\Delta$ and the SPAD cycle can be represented as $B\Delta + t_d$, the shift sequence $(0, t_d, 2t_d, \ldots)$ can be automatically achieved via the insertion of an enforced dead time between SPAD cycles. Additionally, any arbitrary shift sequence can be implemented in practice by introducing additional artificial delays $(\varepsilon_l)_{l=1}^{L}$ at the end of each SPAD cycle that extend the inactive times beyond $t_d$. In general, the additional delay $\Sigma_l \varepsilon_l$ can require increasing T and/or decreasing L, both of which are likely to be undesirable. In some embodiments, a set of one or more artificial delays $\varepsilon_l$ can be selected such that the total extra delay $\Sigma_l \varepsilon_l \leq 1.5 B\Delta$, by making the SPAD cycle length co-prime with the laser. Accordingly, in some such embodiments, uniform shifting can be implemented in practice at a negligible additional cost in terms of total acquisition time.

Note that the description above generally describes the SPAD active time duration as fixed and equal to $B\Delta$. However, this is merely an example, and in some embodiments the SPAD active time duration can be controlled in addition to, or in lieu of, adding a delay after a fixed SPAD active time. For example, programmable fast-gated SPAD detectors can facilitate flexibility in choosing different active time and SPAD cycle durations. Additionally or alternatively, in some embodiments, arbitrary shift sequences can be implemented by varying the number of active time bins, m, while keeping the inactive duration fixed at $t_d$. This can expand the space of shifting strategies characterized by the active time bins, m, and the shift sequence, $(s_l)_{l=1}^{L}$. Under a fixed acquisition time constraint, the combination of SPAD cycles L and time bins, m, can be represented as:

$$L(m\Delta + t_d) \leq T, \quad (11)$$

Note that the number of SPAD cycles, L, is no longer fixed and can vary with m.

Varying m can lead to an interesting trade-off in which shortening the active time duration causes a larger proportion of each SPAD cycle to be taken up by dead time, while using a very long active time is less efficient because the portion of the active time after the first photon arrival is spent is dead time anyway. In some embodiments, this tradeoff can be resolved by determining an optimal active time that minimizes depth error. In some embodiments, the optimal active time, defined in terms of m, for uniform shifting can be represented as:

$$m^{opt} = \arg \max_m \frac{T}{m\Delta + t_d} \frac{1 - e^{-m\Phi_{bkg}}}{1 - e^{-\Phi_{bkg}}}, \quad (12)$$

As can be appreciated from EQ. (12), as ambient flux $\Phi_{bkg}$ increases, $m^{opt}$ can be expected to decrease. Under high ambient photon flux, the average time until the first photon detection after the beginning of the SPAD active time window is relatively small. As a result, keeping the SPAD active for a longer duration unnecessarily increases the length of the measurement cycle without increasing the amount of information that can be gleaned within the SPAD active time window. It also reduces the number of measurements that can be acquired over a fixed acquisition time. Conversely, at lower flux levels, the optimal active time increases as the average inter-photon arrival time increases.

Figure 7A:
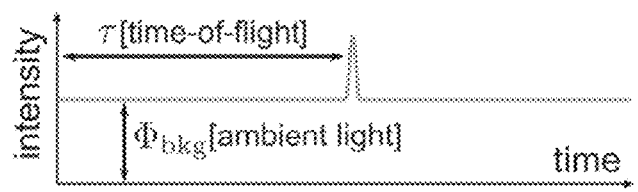
FIG. 7A shows still another example of light impinging on a SPAD-based pulsed LiDAR system over a cycle in the presence of ambient light.
Figure 7B:
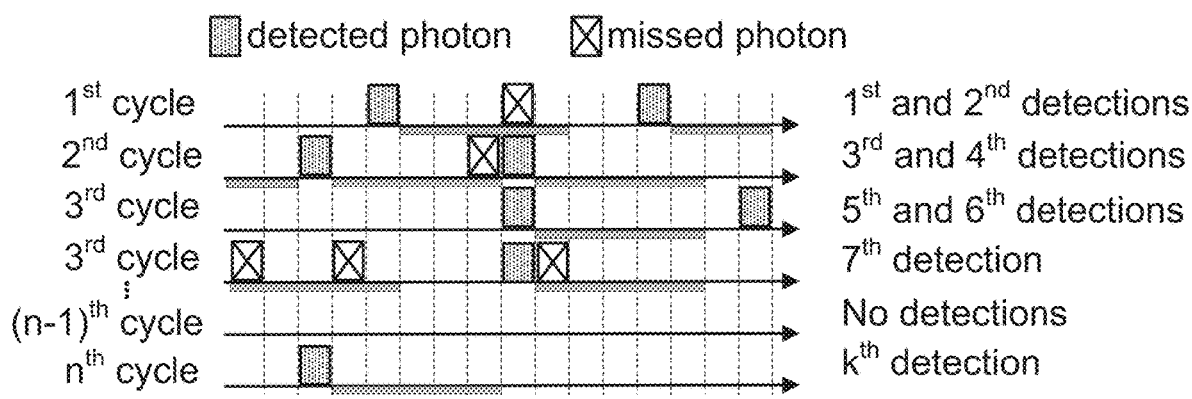
FIG. 7B shows an example of photons detected by a SPAD of a SPAD-based pulsed LiDAR system over various laser cycles and various photo-driven shifted SPAD cycles corresponding to the example shown in FIG. 7A, and photons that subsequently would have been detected by the SPAD in each cycle.
Figure 7C:
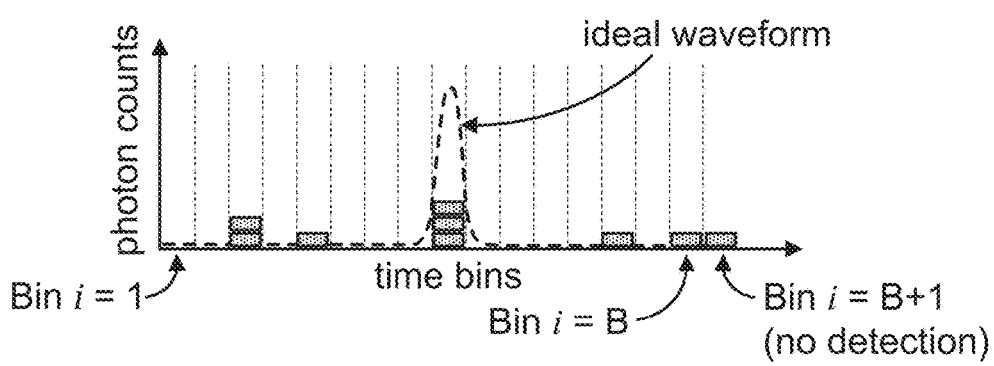
FIG. 7C shows an example of a histogram based on received photons over n laser cycles generated from the times at which a first photon was detected in each photon-driven SPAD cycle.

FIGS. 7A to 7C show an example of light impinging on a SPAD-based pulsed LiDAR system over a cycle in the presence of ambient light. show an example of light impinging on a SPAD-based pulsed LiDAR system over a cycle in the presence of ambient light, photons detected by a SPAD of an asynchronous randomly shifting SPAD-based pulsed LiDAR system over various cycles corresponding to the example shown in FIG. 7A and photons that subsequently would have been detected by the SPAD in each cycle, and a histogram based on received photons over n laser cycles generated from the times at which a first photon was detected by the SPAD in each cycle. As described above, the optimal active time criterion $m^{opt}$ can balance the tradeoff between short and long active time windows in an average sense. However, due to the large variance in the arrival time of the first photon in each cycle, a fixed m cannot achieve both goals on a per-photon basis. In some embodiments, the mechanisms described herein can be used to implement a photon-adaptive active time duration (sometimes referred to herein as photon-driven shifting) in which the SPAD is always active, except in a dead time after a photon detection event. In such embodiments, the SPAD can be activated again when the dead time ends (e.g., as opposed to inhibiting detection events until a next SPAD cycle, as described above in connection with FIGS. 2A, 2B, and 6).

In some embodiments, by activating the SPAD after the dead time has elapsed the active time can be expected to vary randomly due to the stochastic nature of photon arrivals. Consequently, the SPAD cycle lengths also can be expected to vary stochastically and asynchronously with respect to the laser cycles, creating different shifts across different cycles. In some embodiments, over a sufficiently long acquisition time (e.g., a sufficient number of laser cycles), a uniformly spaced sequence of shifts can be achieved with high probability, distributing the effect of pileup over all histogram bins uniformly. For example, as L→∞, photon-driven shifting can generate a substantially uniform shift sequence. As described above in connection with uniform shifting, this can be expected to generate a constant expected denominator sequence.

Note that unlike deterministic shifting, the sequence of shifts is stochastic in a photon-driven shifting scheme because it depends on actual photon arrival/detection times. The scene depths can be estimated using a list of photon arrival times and the generalized Coates's estimator described above in connection with EQ. (10). As described above, photon-driven shifting can generate a uniform expected denominator sequence, which can provide relatively good depth reconstruction performance in terms of minimizing an upper bound on the $\ell_0$ depth error. Unlike uniform shifting where the shift sequence is deterministic and can be pre-computed, the shift sequence in photon-driven shifting is random and depends on the actual photon detection times. In some embodiments, the arrival timestamps of detected photons can be used to compute $D_i$ and $N_i$ used by the generalized Coates's estimator described above in connection with EQ. (10). Note that EQ. (10) has a closed-form expression, and accordingly can be computed relatively efficiently.

The expected denominator sequence in photon-driven shifting can be expected to become asymptotically constant as L→∞. For example, the stochastic shift sequence can represented as $(S_l)_{l=1}^L$, where $0 \le S_l \le B-1$ and $\ominus$ represents subtraction modulo-B with a wrap around when the index falls below 1. This shift sequence can form a Markov chain with state space [0, B−1] and transition density represented as:

$$f_{(S_{i+1}|S_i)} = \begin{cases} \left(\frac{1-e^{-\Phi_{bkg}}}{1-e^{-B\Phi_{bkg}}}\right)e^{-(s_{i+1} \ominus s_i + B - t_d)\Phi_{bkg}}, & \text{if } s_{i+1} \ominus s_i \le t_d \\ \left(\frac{1-e^{-\Phi_{bkg}}}{1-e^{-B\Phi_{bkg}}}\right)e^{-(s_{i+1} \ominus s_i - t_d)\Phi_{bkg}}, & \text{otherwise} \end{cases} \quad (13)$$

The uniform distribution f(S)=1/B is a stationary distribution for this irreducible aperiodic Markov chain, and hence it converges to its stationary distribution as L→∞. If the distribution of the $k^{th}$ shift is represented as $f^k(S)$, then:

$$\lim_{k \to \infty} f^k(s) = f(s)$$

Accordingly, it can be appreciated that as L→∞, the empirical distribution of $(s_1, s_2, \ldots, s_L)$→f(s) and all shifts are achieved with equal probability making and the denominator sequence uniform on average.

In some embodiments, $N_i$ and $D_i$ can be calculated from the shift sequence and the sequence of photon arrival times, which can lead to computationally tractable techniques for computing the generalized Coates's estimate for the flux waveform, and hence estimating scene depths. The photon arrival times (in terms of bin index) in each SPAD cycle measured with respect to the most recent laser cycle can be represented as $(u_1, u_2, \ldots, u_L)$. Note that in this example, $1 \le u_i \le B$, as each SPAD cycle must have a photon detection event, but some laser cycles may have no corresponding detection and information can be record in a bin B+1 to indicate that a laser cycle occurred with no photon detection. In some such embodiments, the histogram of photon counts can be represented as:

$$N_i = \sum_{l=1}^{L} \mathbb{1}(u_l = i)$$

In some embodiments, the denominator sequence can be computed by stepping through a list of photon arrival times $u_l$ for each SPAD cycle. For example, for each photon detection time $D_j$ can be incremented for every bin index $j \in J_{l,u_l}$.

In some embodiments, the denominator sequence in the photon-driven shifting mode can also be computed in closed form. For example, the shift sequence $(s_l)_{l=1}^L$ can be determined by the photon arrival times $u_l$ as $s_{l+1} = u_l \oplus n_d$ where $n_d$ is the dead time in units of bins. As described above, $N_i$ can be determined by the histogram of $(u_l)_{l=1}^L$. In such an example, $D_i$ can be computed in closed form in terms of the histogram counts: For each bin index i, there are T/BΔ depth bins in total which can potentially detect photons. However, a photon detection in any particular depth bin inhibits the $n_d$ bins that follow the detection from detecting photons. Accordingly, the value of $D_i$ at the $i^{th}$ bin can be determined by subtracting these bins from the total, which can be represented as:

$$D_i = \frac{T}{B\Delta} - \sum_{j=1}^{t_d/\Delta} N_{i\ominus j}$$

In some embodiments, the following closed-form expression can be used to adapt the generalized Coates's estimator for photon-driven shifting:

$$\hat{\tau} = \underset{i}{\mathrm{argmax}} \frac{N_i}{D_i} \quad (14)$$

$$\underset{i}{\mathrm{argmax}} \frac{N_i}{\frac{T}{B\Delta} - \sum_{j=1}^{t_d/\Delta} N_{i\ominus j}}.$$

Figure 18:
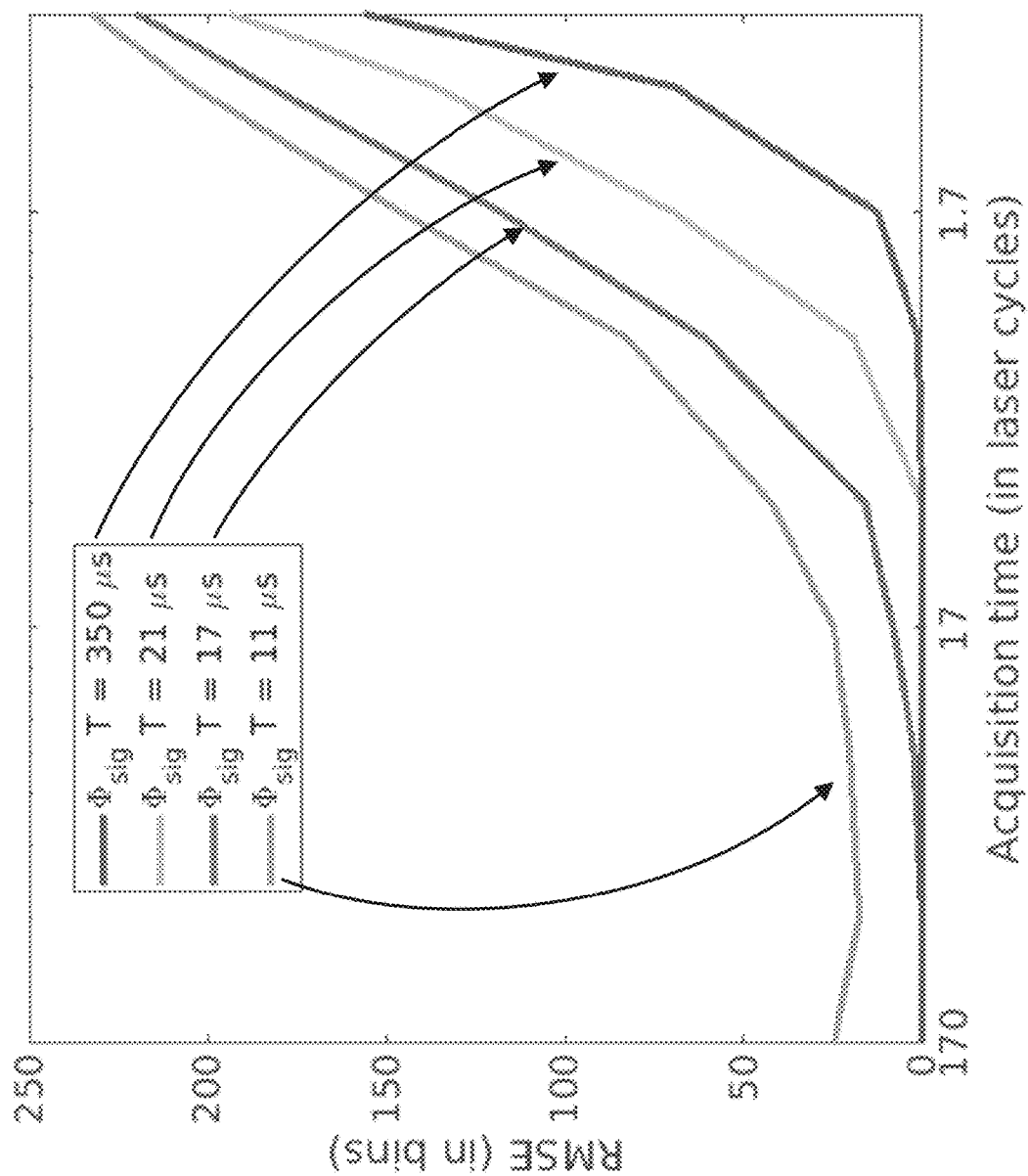
FIG. 18 shows an example of simulated relative depth errors for various combinations of light source signal intensity and acquisition time for an asynchronous SPAD-based pulsed LiDAR system with photon-driven shifting implemented in accordance with some embodiments of the disclosed subject matter.

As described above, over a sufficiently long acquisition time (e.g., a sufficient number of laser cycles), a uniformly spaced sequence of shifts can be achieved with high probability, distributing the effect of pileup over all histogram bins uniformly. Intuitively, from this observation, one might expect a large number of cycles to be used to achieve uniform shifting and remove pileup. However, techniques described above in connection with photon-driven shifting and optimal attenuation can produce relatively high performance with very few laser cycles, provided that the signal flux is relatively high. This holds even for relatively high ambient flux levels (e.g., ambient flux of $\Phi_{bkg}$=0.05 photons per bin, compared to an ambient flux on the order of $\Phi_{bkg}$=10$^{-5}$ in some conventional low flux operating environment). Intuitively, even though uniform shifting cannot occur with the number of laser cycles being much less than the number of bins B, the combination of relatively high effective $\Phi_{sig}$ and relatively low effective $\Phi_{bkg}$ can obviate the need for shifting. As described below, FIG. 18 shows an example of relative depth errors for various combinations of light source signal intensity and acquisition time. Note that depth errors remain relatively low (e.g., in the range of 0-100 depth bins) for each signal intensity/acquisition time pair down to an acquisition time of about two laser cycles.

Figure 8:
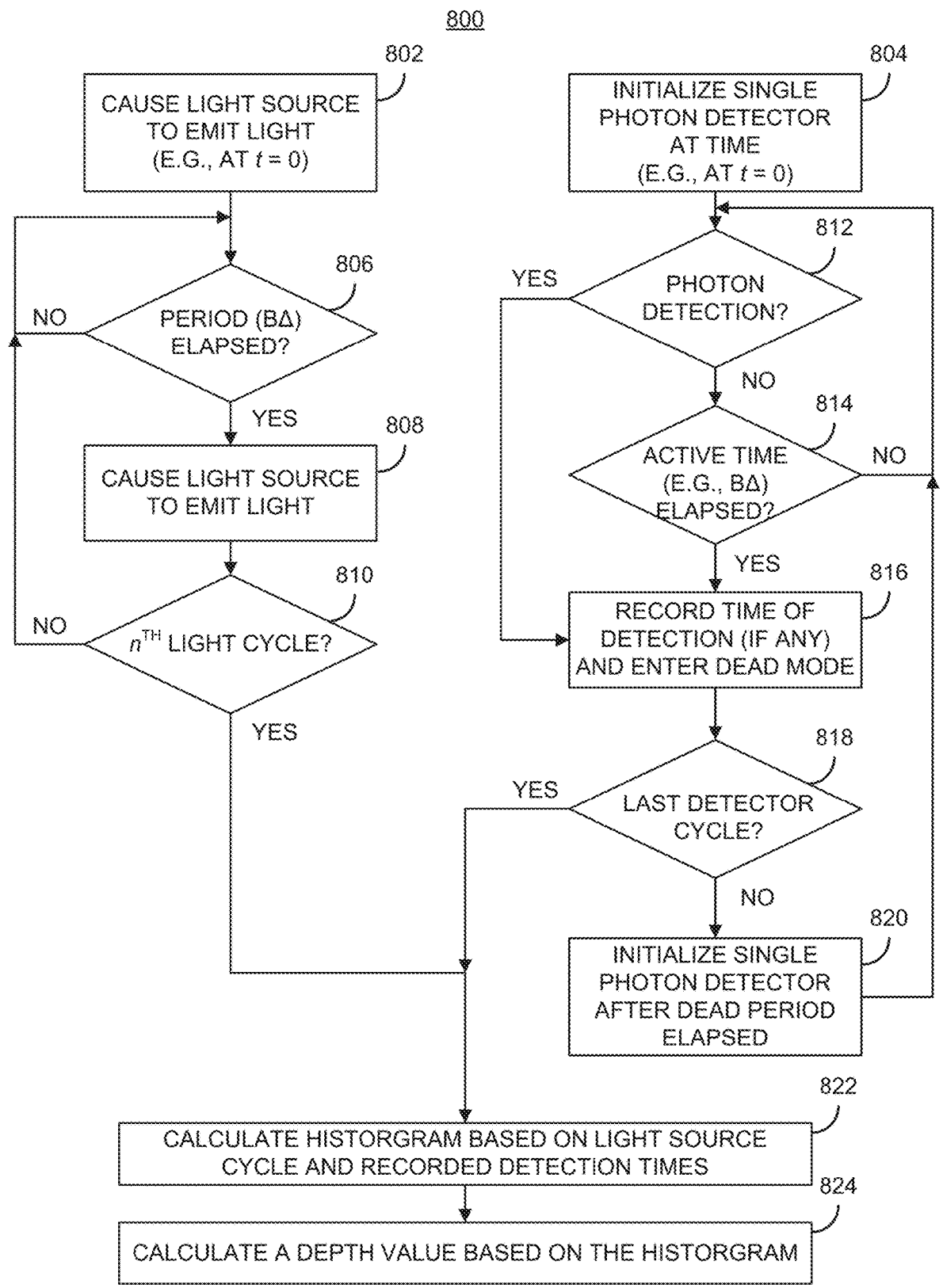
FIG. 8 shows an example of a process for generating depth values with improved depth precision in ambient light conditions using a single photon depth imaging system with uniformly shifting detection cycles in accordance with some embodiments of the disclosed subject matter.

FIG. 8 shows an example 800 of a process for generating depth values with improved depth precision in ambient light conditions using a single photon depth imaging system with uniformly shifting detection cycles in accordance with some embodiments of the disclosed subject matter. At 802, process 800 cause a light source (e.g., light source 402) to emit a light signal. For example, process 800 can cause the light source to emit a first laser pulse corresponding to a first laser cycle of n laser cycles.

At 804, process 800 can cause a single photon detector (e.g., a SPAD) to be initialized in connection with the light emitted at 802. For example, process 800 can cause a gate that controls the single photon detector to be enter a state in which the single photon detector is configured to detect photons. In some embodiments, process 800 can initialize the single photon detector at the same time that the light source is caused to emit light at 802.

At 806, process 800 can determine whether a particular period of time has elapsed since light was emitted at 802. For example, process 800 can determine whether the light source cycle period has elapsed. As a more particular example, process 800 can determine whether an amount of time B$\Delta$ has elapsed.

If process 800 determines that the period has not elapsed ("NO" at 806), process 800 can return to 806 to continue to determine whether the period of time has elapsed. Otherwise, if the period of time has elapsed ("YES" at 806), process 800 can move to 808 and cause the light source to emit light again to start a new light source cycle.

At 810, process 800 can determine whether the most recent light source cycle was the last light source cycle. For example, process 800 can determine whether a predetermined number of light source cycles (n) have elapsed. For example, if the SPAD-based LiDAR is configured to generate data using 1,000 laser cycles (or any other suitable number of laser cycles, such as 900, 800, 750, 700, 600, 500, 400, 300, etc.), process 800 can determine whether the most recent laser cycle is the 1,000th laser cycle.

If process 800 determines that the most recent light source cycle was not the last light source cycle ("NO" at 810), process 800 can return to 806 to determine whether the period of time has elapsed since a most recent light source emission. Otherwise, if process 800 determines that the most recent light source cycle was the last light source cycle ("YES" at 810), process 800 can move to 822.

At 812, process 800 can determine whether a photon detection event occurred. For example, process 800 can determine whether the SPAD of a SPAD-based LiDAR detected a photon. In some embodiments, such a photon detection event can be detected based an output of the single-photon detector changing state and/or outputting a value indicative of a time at which the detection event occurred.

If process 800 determines that a photon detection event did not occur ("NO" at 812), process 800 can move to 814. At 814, process 800 can determine if a single photon detector active time window has elapsed. For example, process 800 can determine whether a SPAD cycle has elapsed. As a more particular example, process 800 can determine whether an amount of time B$\Delta$ has elapsed, corresponding to the time period of the laser cycle. In some embodiments, the active time can be any suitable amount of time. For example, as described above in connection with FIG. 6, the active time can be equal to the laser cycle time period, and a dead time and/or artificial delay can be added after the laser cycle time period. As another example, as described above in connection with FIG. 6, the active time can be an optimal active time calculated based on a time budget and a background signal strength. In a more particular example, EQ. (12) can be used to determine an active time for the single-photon detector.

If process 800 determines that the active time has not elapsed ("NO" at 814), process 800 can return to 812 to continue to determine whether a photon detection even has occurred. Otherwise, if process 800 determines that the active time has elapsed ("YES" at 814) and/or if process 800 determines that a photon detection even occurred ("YES" at 812), process 800 move to 816.

At 816, process 800 can record a time of the photon detection event. Alternatively, if no photon detection event occurred at 812, process 800 can record that no photon detection event occurred to the most recent single photon detector cycle. In some embodiments, the time at which a photon detection event occurred can be a relative time (e.g., in relation to the most recent light source emission) and/or can be an absolute time (e.g., a particular time in relation to an arbitrary or set time). In some embodiments, when a light source is caused to emit light, process 800 can record a time at which the light source emitted the light. Alternatively, process 800 can record a first time at which the light source emitted light (e.g., at 802), and can infer the other light emission times based on the period that passes between light emissions.

At 818, process 800 can determine whether the most recent detection cycle was a last detection cycle. For example, in a deterministic (e.g., a uniform) shifting scheme, the time budget T for acquisition at a particular scene point can be divided into a predetermined number of single photon detection cycles. In such an example, process 800 can determine whether the most recent single photon detection cycle was the last cycle. As another example, process 800 can determine whether the most recent single photon detection cycle based on whether a predetermined number of light source cycles have elapsed since the first light cycle at 802.

If process 800 determines that the most recent single photon detection cycle was not the last cycle for the current scene point ("NO" at 818), process 800 can move to 820. At 820, process 800 can cause the single photon detector to be initialized after a dead period has elapsed. In some embodiments, the dead period can include a dead time of the single-photon detector that is caused by the detection of the photon. Additionally, the dead period can include a remainder of the single photon detection cycle after the photon detection event at 812 and/or a time period after the active time has elapsed. For example, as described above in connection with FIG. 6, after a photon detection has occurred, a SPAD can be turned off (e.g., by causing a gate that controls operation of the SPAD to enter a state that inhibits operation of the SPAD) until the SPAD cycle, including an active time and a deactivated time has elapsed. After initializing the single-photon detector at 820, process 800 can return to 812 to determine whether a photon detection event has occurred.

As described above in connection with FIG. 6, enforcing a dead time after the active period has elapsed regardless of whether and/or when a photon was detected can result in a uniform shift between the single-photon detector cycle and the laser cycle. Additionally or alternatively, the SPAD cycle can include a different series of shifts $S_j$ that may or may not be uniform.

If process 800 determines that the most recent single photon detection cycle was the last cycle for the current scene point ("YES" at 818), process 800 can move to 822. At 822, process 800 can calculate a histogram based on the light source cycle and the recorded detection times. For example, as described above in connection with FIG. 6, process 800 can calculate a histogram based on the techniques described in connection with EQS. (8) and (9).

At 824, process 800 can calculate an estimated depth value for a scene point for which the histogram was calculated at 822. For example, process 800 can calculate an estimated depth value based on the generalized Coates's estimator described above in connection with EQ. (10). Note that process 800 can calculate the histogram at 822 and/or the depth value at 824 prior to moving on to another scene point, while data is being generated for another scene point (e.g., using 802-820), and/or after data has been generated for one or more additional scene points.

Figure 9:
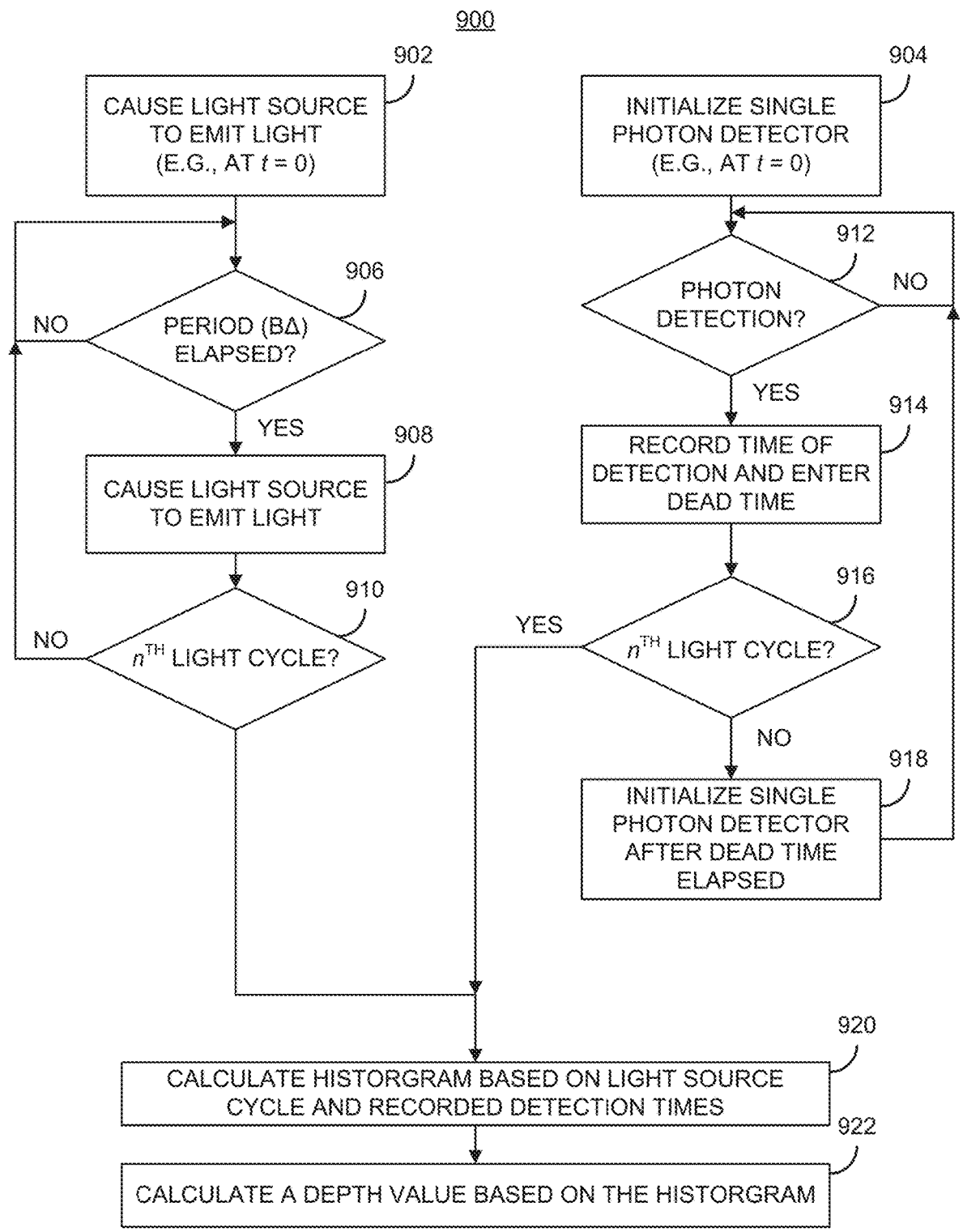
FIG. 9 shows an example of a process for generating depth values with improved depth precision in ambient light conditions using a single photon depth imaging system with photon-driven shifting of detection cycles in accordance with some embodiments of the disclosed subject matter.

FIG. 9 shows an example 900 of a process for generating depth values with improved depth precision in ambient light conditions using a single photon depth imaging system with photon-driven shifting of detection cycles in accordance with some embodiments of the disclosed subject matter. At 902, process 900 cause a light source (e.g., light source 402) to emit a light signal. For example, process 900 can cause the light source to emit a first laser pulse corresponding to a first laser cycle of n laser cycles.

At 904, process 900 can cause a single photon detector (e.g., a SPAD) to be initialized in connection with the light emitted at 902. For example, process 900 can cause a gate that controls the single photon detector to be enter a state in which the single photon detector is configured to detect photons. In some embodiments, process 900 can initialize the single photon detector at the same time that the light source is caused to emit light at 902.

At 906, process 900 can determine whether a particular period of time has elapsed since light was emitted at 902. For example, process 900 can determine whether the light source cycle period has elapsed. As a more particular example, process 900 can determine whether an amount of time BΔ has elapsed.

If process 900 determines that the period has not elapsed ("NO" at 906), process 900 can return to 906 to continue to determine whether the period of time has elapsed. Otherwise, if the period of time has elapsed ("YES" at 906), process 900 can move to 908 and cause the light source to emit light again to start a new light source cycle.

At 910, process 900 can determine whether the most recent light source cycle was the last light source cycle. For example, process 900 can determine whether a predetermined number of light source cycles (n) have elapsed. In a more particular example, if the SPAD-based LiDAR is configured to generate data using 1,000 laser cycles (or any other suitable number of laser cycles, such as 900, 800, 750, 700, 600, 500, 400, 300, 200, 150, 100, 50, 25, 15, 10, 9, 8, 7, 6, 5, 4, 3, 2, or any other suitable number of laser cycles.), process 900 can determine whether the most recent laser cycle is the 1,000th laser cycle.

If process 900 determines that the most recent light source cycle was not the last light source cycle ("NO" at 910), process 900 can return to 906 to determine whether the period of time has elapsed since a most recent light source emission. Otherwise, if process 900 determines that the most recent light source cycle was the last light source cycle ("YES" at 910), process 900 can move to 920.

At 912, process 900 can determine whether a photon detection event occurred. For example, process 900 can determine whether the SPAD of a SPAD-based LiDAR detected a photon. In some embodiments, such a photon detection event can be detected based an output of the single-photon detector changing state and/or outputting a value indicative of a time at which the detection event occurred.

If process 900 determines that a photon detection event did not occur ("NO" at 912), process 900 can return to 912 to continue determining whether a photon detection event has occurred. In some embodiments, process 900 can be used to implement a photon-driven shifting scheme in which, process 900 can continue to determine if a photon detection event occurs until such an event occurs, as described above in connection with FIGS. 7A to 7C. For example, the SPAD active window can be limited by only photon detection events, without an predefined maximum active window.

Otherwise, if process 900 determines that a photon detection event occurred ("YES" at 912), process 900 can move to 914. At 914, process 900 can record a time of the photon detection event. In some embodiments, the time at which a photon detection event occurred can be a relative time (e.g., in relation to the most recent light source emission) and/or can be an absolute time (e.g., a particular time in relation to an arbitrary or set time). In some embodiments, when a light source is caused to emit light, process 900 can record a time at which the light source emitted the light. Alternatively, process 900 can record a first time at which the light source emitted light (e.g., at 902), and can infer the other light emission times based on the period that passes between light emissions.

At 916, process 900 can determine whether the most recent detection cycle was a last detection cycle by determining whether a predetermined number of light cycles has been reached. For example, process 900 can determine whether a predetermined number of light source cycles (n) have elapsed. In a more particular example, if the SPAD-based LiDAR is configured to generate data using 1,000 laser cycles (or any other suitable number of laser cycles, such as 900, 800, 750, 700, 600, 500, 400, 300, 200, 150, 100, 50, 25, 15, 10, 9, 8, 7, 6, 5, 4, 3, 2, or any other suitable number of laser cycles), process 900 can determine whether the most recent laser cycle is the 1,000th laser cycle. Note that this is merely an example, and other techniques can be used to determine when to inhibit the single photon detector from detecting photon arrivals. For example, when a predetermine number of laser cycles has elapsed (e.g., at 910), process 900 can cause a SPAD to be turned off or otherwise inhibited from detecting photon arrivals.

If process 900 determines that the most recent light source cycle was not the last light source cycle ("NO" at 916), process 900 can move to 918. At 918, process 900 can cause the single photon detector to be initialized after a dead time has elapsed. In some embodiments, the dead time can be controlled using an active quenching circuit, and can include a dead time of the single-photon detector that is caused by the detection of the photon.

Otherwise, if process 900 determines that the most recent single photon detection cycle was the last cycle for the current scene point ("YES" at 916), process 900 can move to 920. At 920, process 900 can calculate a histogram based on the light source cycle and the recorded detection times. For example, process 900 can calculate a histogram based on one or more technique described above in connection with FIGS. 7A to 7C.

At 922, process 900 can calculate an estimated depth value for a scene point for which the histogram was calculated at 920. For example, process 900 can calculate an estimated depth value based on the generalized Coates's estimator described above in connection with EQ. (14). Note that process 900 can calculate the histogram at 920 and/or the depth value at 922 prior to moving on to another scene point, while data is being generated for another scene point (e.g., using 902-918), and/or after data has been generated for one or more additional scene points.

Figure 10:
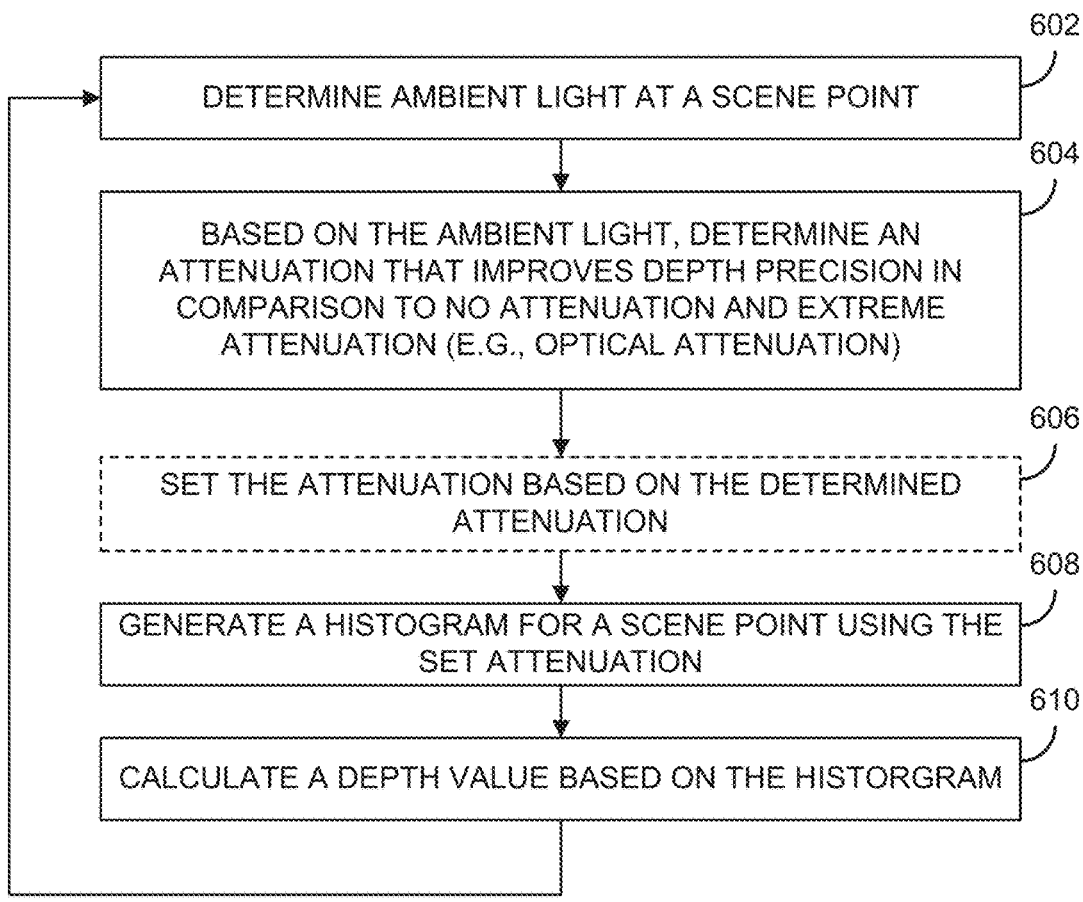
FIG. 10 shows an example of a process for improving the depth precision in ambient light conditions of an asynchronous single photon depth imaging system in accordance with some embodiments of the disclosed subject matter.

FIG. 10 shows an example 1000 of a process for improving the depth precision in ambient light conditions of an asynchronous single photon depth imaging system in accordance with some embodiments of the disclosed subject matter. Recently, techniques for determining an optimal incident flux level at which pileup in a synchronous SPAD LiDAR is minimized while maintaining high SNR have been described. For example, such techniques have been described in U.S. patent Ser. No. 16/297,320, filed Mar. 8, 2019, which is hereby incorporated by reference herein in its entirety. For example, such an optimal flux level can be achieved by optically attenuating the incident photon flux. In the space of acquisition strategies to deal with pileup, attenuation can be considered a complementary approach to asynchronous shifting.

At 1002, process 1000 can determine the ambient flux intensity at a scene point using any suitable technique or combination of techniques. For example, process 1000 can capture data over a period of time (e.g., equal in time to a particular number of light source cycles) at a particular scene point with the light source inactive. In such an example, process 1000 can estimate the ambient flux at the scene point based on the distribution of photon detections within the period of time, and based on the current attenuation. In such an example, the attenuation factor Y can be set to 1. In a more particular example, process 1000 can collect data over N' laser cycles with the laser power set to zero, and can generate a histogram of photon counts ($N_1'$, $N_2'$, ..., $N_B'$) over the N' cycles (note that N' can be any suitable number of cycles, for example 20 to 30 cycles can be enough to determine the background flux relatively accurately). In such an example, the background flux $\Phi_{bkg}$ can be estimated using the following expression:

$$\hat{\Phi}_{bkg} = \ln\left(\frac{\sum_{i=1}^{B} iN_i' + BN_{B+1}'}{\sum_{i=1}^{B} iN_i' - N'}\right) \Big/ \Upsilon_{cal}$$

where $\Upsilon_{cal}$ is the attenuation factor applied during the determination of the background flux. In some embodiments, $\Upsilon_{cal}$ can be 1 such that the background flux $\Phi_{bkg}$ is determined based on the maximum transmittance of the system. However, this is merely an example, and other values of attenuation can be used while determining the background flux. For example, if $\Upsilon_{cal}$ is 0.5, then the estimated background flux can be adjusted to account for the current attenuation factor. For example, in some embodiments, data captured at 1002 can use the attenuation factor determined for a previous scene point while determining the flux, which can in some cases require less adjustments to the attenuation factor as scene points in close proximity in space may have similar background flux.

As yet another example, process 1000 can collect data over a period of time using one or more conventional detectors (e.g., CMOS or CCD-based pixels), and the background flux can be estimated based the brightness value recorded by the conventional detector(s). In such an example, the value generated by the conventional detector can be converted to a photon flux based on the gain provided by the pixel. Such a conversion can be determined during a calibration of the system and programmed (e.g., hard-coded) into the system. In some embodiments, the period of time can be on the order of tens to hundreds of microseconds. For example, the exposure time of the conventional detector can be in the range of 30 to 100 microseconds, and the flux detected during that exposure time can be used to determine the background flux at a particular scene point.

At 1004, process 1000 can determine an attenuation factor that is expected to improve the depth precision. For example, in some embodiments, process 1000 can calculate the optimal attenuation $\Upsilon^{opt}$ for a photon-driven shifting scheme. In some embodiments, the optimal attenuation fraction for photon-driven shifting can be represented as:

$$\Upsilon^{opt}_{photo-driven} = \min\left\{1.0, \operatorname*{argmin}_{\Upsilon} \frac{1 + t_d\left(1 - e^{-\Upsilon\Phi_{bkg}}\right)}{e^{-\Upsilon\Phi_{bkg}}\left(1 - e^{-\Upsilon\Phi_{sig}}\right)}\right\}.$$

In some embodiments, process 1000 can determine an optimal attenuation $Y^{opt}$ for a deterministic shifting scheme numerically by solving an optimization problem. Additionally or alternatively, in some embodiments, process 1000 can determine an optimal combination of attenuation Y and active time m, which can be represented as:

$$(\Upsilon, m)_{deterministic}^{opt} = \underset{m,\Upsilon}{\operatorname{argmax}} \frac{T}{(m\Delta + t_d)} \frac{(1 - e^{-\Upsilon m\Phi_{bkg}})(1 - e^{-\Upsilon \Phi_{sig}})}{e^{\Upsilon \Phi_{bkg}} - 1}$$

In some embodiments, the expected denominator sequence can be represented as:

$$\ell_{[D_i]} = T/(B(1 + (1 - e^{-\Upsilon \Phi_{bkg}})t_d)). \quad (15)$$

Using EQ. (15), the optimal attenuation fraction can be represented as:

$$\Upsilon_{photo\text{-}driven}^{opt} = \underset{\Upsilon}{\operatorname{argmax}}[\mathbb{E}[D_i](q_\tau - q_i)]$$

$$= \underset{\Upsilon}{\operatorname{argmax}} \frac{Te^{-\Upsilon \Phi_{bkg}}(1 - e^{-\Upsilon \Phi_{sig}})}{B(1 + (1 - e^{-\Upsilon \Phi_{bkg}})t_d)}$$

As can be appreciated from the above expression, optimal attenuation fraction $Y_{photo\text{-}driven}^{opt}$ depends on various system parameters (e.g., including number of bins B, acquisition time T, and the dead time $t_d$), which are known $Y_{photo\text{-}driven}^{opt}$ can also depend on the signal and background flux levels, which can be estimated a priori using a small number of laser cycles. Using the estimated values, the optimal flux attenuation can be determined, which can be used to further reduce the pile-up, and thus improve the depth estimation performance, as described below in connection with simulated results shown in FIG. 15.

As another example, process 1000 can calculate an attenuation from a predetermined set of attenuation factors that is expected to increase the depth precision of the system. In such an example, a LiDAR system may be configured with a predetermined number of particular attenuation levels that the system can utilize when generating data. In a more particular example, process 1000 can determine which of the particular attenuation levels to set based on the optimal attenuation $Y^{opt}$. As described below, for example in connection with FIG. 15, although there is generally a specific optimal attenuation value that can be calculated, relative depth error is generally relatively flat around the optimal level in many cases. Accordingly, if the LiDAR system is configured with eight predetermined attenuation levels (e.g., Y={0.5, 0.2, 0.1, 0.05, 0.02, 0.01, 0.005, 0.002}, which can be described using equivalent optical densities of roughly OD={0.3, 0.6, 1.0, 1.3, 1.6, 2.0, 2.3, 2.6}), process 1000 can determine the optimal attenuation, and can select the predetermined value that is closest to the optimal value.

As yet another example, process 1000 can include calculating an average expected background flux value that a LiDAR system is expected to encounter in the environment in which it operates and/or a distribution of background flux values. In such an example, process 1000 can calculate an attenuation value that is expected to minimize average depth errors given the average expected background flux. In a more particular example, a LiDAR system for an autonomous vehicle can be expected to operate in a range of conditions, from bright sunlight to relatively dark conditions at night. In this example, the average daytime background flux that the autonomous vehicle is expected to encounter can be determined (e.g., by operating a LiDAR system with source power set to zero while the vehicle is operated) and/or the average nighttime background flux. Process 600 can include calculating an attenuation factor that will minimize depth errors over an expected range of background flux in which the autonomous vehicle is expected to operate. In such an example, a LiDAR system can be implemented with a fixed attenuation, or multiple fixed attenuations that are expected to minimize average depth errors.

At 1006, process 1000 can set an attenuation to be used when recording data based on the attenuation level determined at 1004. For example, process 1000 can cause a variable attenuation element (e.g., a diaphragm, a liquid crystal shutter, an attenuation wheel, a quantum efficiency of a SPAD, etc.) to be set to the value determined at 1004. As described above in connection with 1004, setting the attenuation may be done on a global basis prior to capturing data, and may not be performed for every scene point. For example, if the LiDAR is equipped with a fixed attenuator (e.g., based on an attenuation factor that is expected to minimize average depth errors), 1006 can be performed once while the LiDAR is being designed or installed. As another example, if the LiDAR is equipped with multiple detectors associated with different attenuations, the attenuation factor for each detector may be fixed, and rather than setting an attenuation(s) at 1006, process 1000 can record data using each detector, and can select which data to use based on the attenuation determined at 1004. In such examples, 1006 can be omitted.

At 1008, process 1000 can generate a histogram for a scene point using data that is recorded using the set attenuation factor. In some embodiments, the histogram generation procedure can be carried out using the same techniques described above in connection with 920 of FIG. 9 and FIGS. 7A to 7C.

At 1010, process 1000 can calculate a depth value for the scene point based on the histogram generated at 1008. In some embodiments, process 1000 can use any suitable technique or combination of techniques to determine the depth value of the scene point. For example, as described above in connection with 924 of FIG. 9 and FIGS. 7A to 7C and EQS. (10) and (14), process 1000 can use a generalized Coates's estimator.

FIG. 11 shows an example of a surface generated using depth information from a synchronous SPAD-based pulsed LiDAR system, and a surface generated from depth information generated by an asynchronous SPAD-based pulsed LiDAR system implemented in accordance with some embodiments of the disclosed subject matter.

The results shown in FIG. 11 were generated using SPAD-based LiDAR system that included a 405 nm pulsed laser (model LDH-P-C-405B available from Picoquant of Berlin, German), a TCSPC module (model HydraHarp 400 available from Picoquant), and a fast-gated SPAD that can be operated in both triggered and free-running modes and has a programmable dead time which was set to 50 nanoseconds (ns). The laser was operated at a repetition frequency of 10 megahertz (MHz) for an unambiguous depth range of 15 meters (m) discretized into 1000 histogram bins. For uniform shifting, the SPAD was operated using its internal clock to obtain shifts between the SPAD measurement windows and the laser cycles. Note that the conventional image was generated using synchronous acquisition techniques with no additional attenuation (e.g., the results do not reflect extreme attenuation nor the optimal attenuation described in U.S. patent Ser. No. 16/297,320), and the asynchronous image was generated using photon-driven asynchronous techniques.

Figure 12:
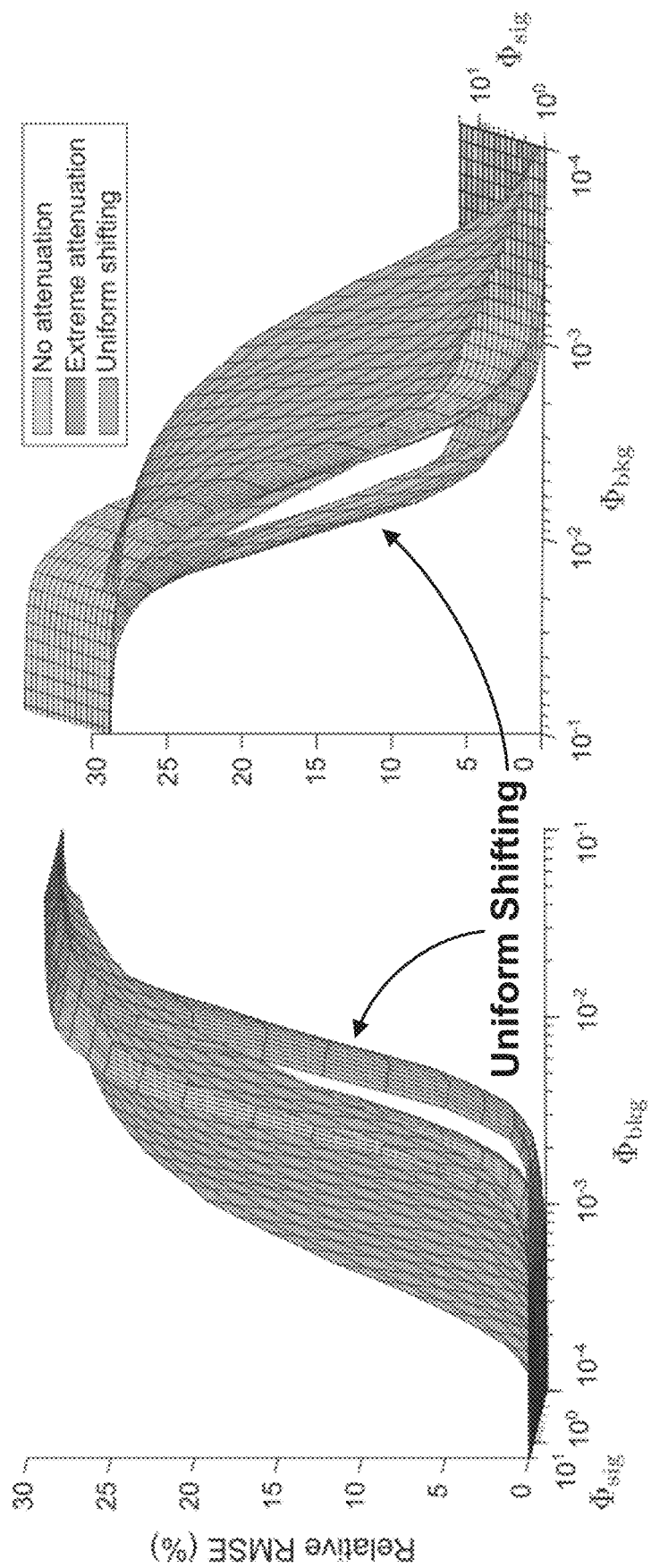
FIG. 12 shows examples of surfaces depicting simulated root mean square error of depth values for synchronous SPAD-based pulsed LiDAR with no attenuation, synchronous SPAD-based pulsed LiDAR with extreme attenuation, and asynchronous SPAD-based pulsed LiDAR with uniform shifting and no attenuation for various combinations of light source signal intensity and ambient light intensity.

FIG. 12 shows examples of surfaces depicting simulated root mean square error of depth values for synchronous SPAD-based pulsed LiDAR with no attenuation, synchronous SPAD-based pulsed LiDAR with extreme attenuation, and asynchronous SPAD-based pulsed LiDAR with uniform shifting and no attenuation for various combinations of light source signal intensity and ambient light intensity. Note that the results for the uniform shifting in FIG. 12 were generated without additional attenuation, such that the attenuation factor used to generate the "uniform shifting" results was the same as the attenuation factor used to generate the "no attenuation" results. However, the "no attenuation" can include a baseline level of attenuation, such as attenuation from a narrow pass filter, a diaphragm, etc., and does not necessarily correspond to a condition in which the SPAD is exposed to the environment with zero attenuation.

FIG. 12 shows a comparison of performances of uniform shifting and conventional synchronous acquisition via Monte Carlo simulations. The RMSE shown in FIG. 12 is a relative RMSE defined in a modulo-B sense with a wrap around at the $B^{th}$ histogram bin. Accordingly, the maximum possible relative RMSE is 30%. A histogram with B=1000 and Δ=100 ps was used to generate the simulated results, and a wide range of background and signal photon flux levels were simulated in the discrete delta pulse model of EQ. (2). Uniform shifts were simulated by choosing equally spaced shifts between 0 and 1000 and generating photon counts using EQ. (9). Depth was estimated using the generalized estimator described in connection with EQ. (10). As shown in FIG. 12, the depth RMSE with uniform shifting is considerably lower than conventional synchronous acquisition. At certain combinations of signal and background flux levels, uniform shifting estimates depths with almost zero RMSE while the conventional techniques generally estimate a significantly higher error.

Figure 13:
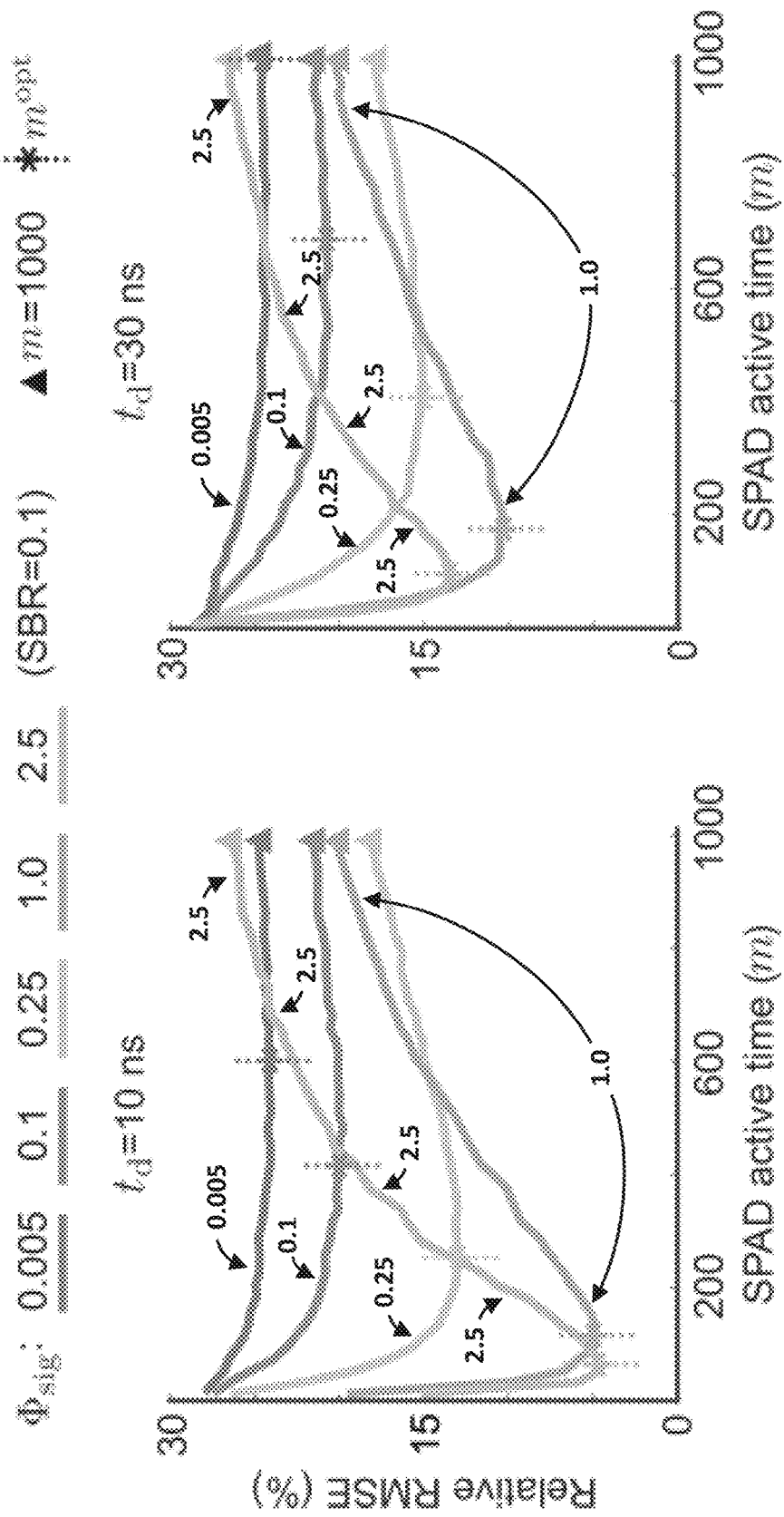
FIG. 13 shows examples of simulated relative depth errors for various light source signal intensities in the presence of ambient light with different enforced dead times $t_d$ after each SPAD active time in an asynchronous SPAD-based pulsed LiDAR with uniform shifting.

FIG. 13 shows examples of simulated relative depth errors for various light source signal intensities in the presence of ambient light with different enforced dead times $t_d$ after each SPAD active time in an asynchronous SPAD-based pulsed LiDAR with uniform shifting. Note that in FIG. 13 SBR is held constant such that as the signal intensity increase the background intensity also increases to maintain an SBR of 0.1. The simulated results were used to generate the plots shown in FIG. 13 indicating a relationship between RMSE and m for a wide range of ambient flux levels and two different values of dead time $t_d$. Note that the RMSE curves have local minima which are near the optimal active time calculated as described above in connection with EQ. (12). For a wide range of photon flux levels shown in FIG. 13, $m^{opt}$ is shorter than the conventionally used active time of m=B=1000 bins, and gives a significant improvement in RMSE by up to a factor of 6.

Figure 14:
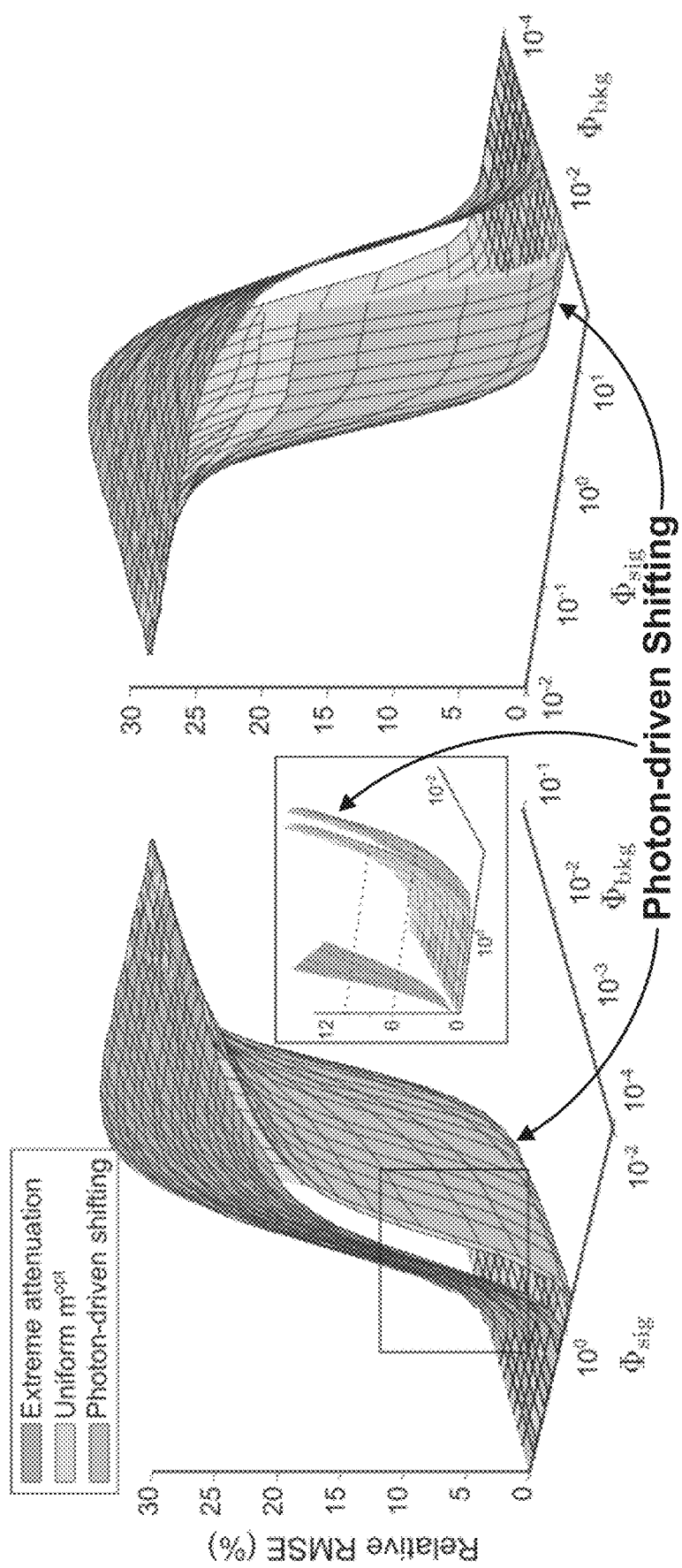
FIG. 14 shows examples of surfaces depicting simulated root mean square error of depth values for synchronous SPAD-based pulsed LiDAR with extreme attenuation, asynchronous SPAD-based pulsed LiDAR with uniform shifting and no attenuation, and asynchronous SPAD-based pulsed LiDAR with photon-driven shifting and no attenuation for various combinations of light source signal intensity and ambient light intensity.

FIG. 14 shows examples of surfaces depicting simulated root mean square error of depth values for synchronous SPAD-based pulsed LiDAR with extreme attenuation, asynchronous SPAD-based pulsed LiDAR with uniform shifting and no attenuation, and asynchronous SPAD-based pulsed LiDAR with photon-driven shifting and no attenuation for various combinations of light source signal intensity and ambient light intensity. The simulated RMSE results for photon-driven shifting and uniform shifting with optimized active time m over a wide range of signal and ambient flux levels are depicted. For some flux levels the proposed shifting techniques provide close to zero depth error while the conventional synchronous technique with extreme attenuation has the maximum possible error. Note that the RMSE of photon-driven shifting is similar to uniform shifting with optimal active time m, although for some flux levels it provides a factor of 2 improvement over uniform shifting (e.g., as shown in the inset in the plot on the left). Although it may appear that photon-driven shifting always performs better than uniform shifting from the simulated results shown in FIG. 14, there are certain regimes where uniform shifting outperforms photon-driven shifting.

Figure 15:
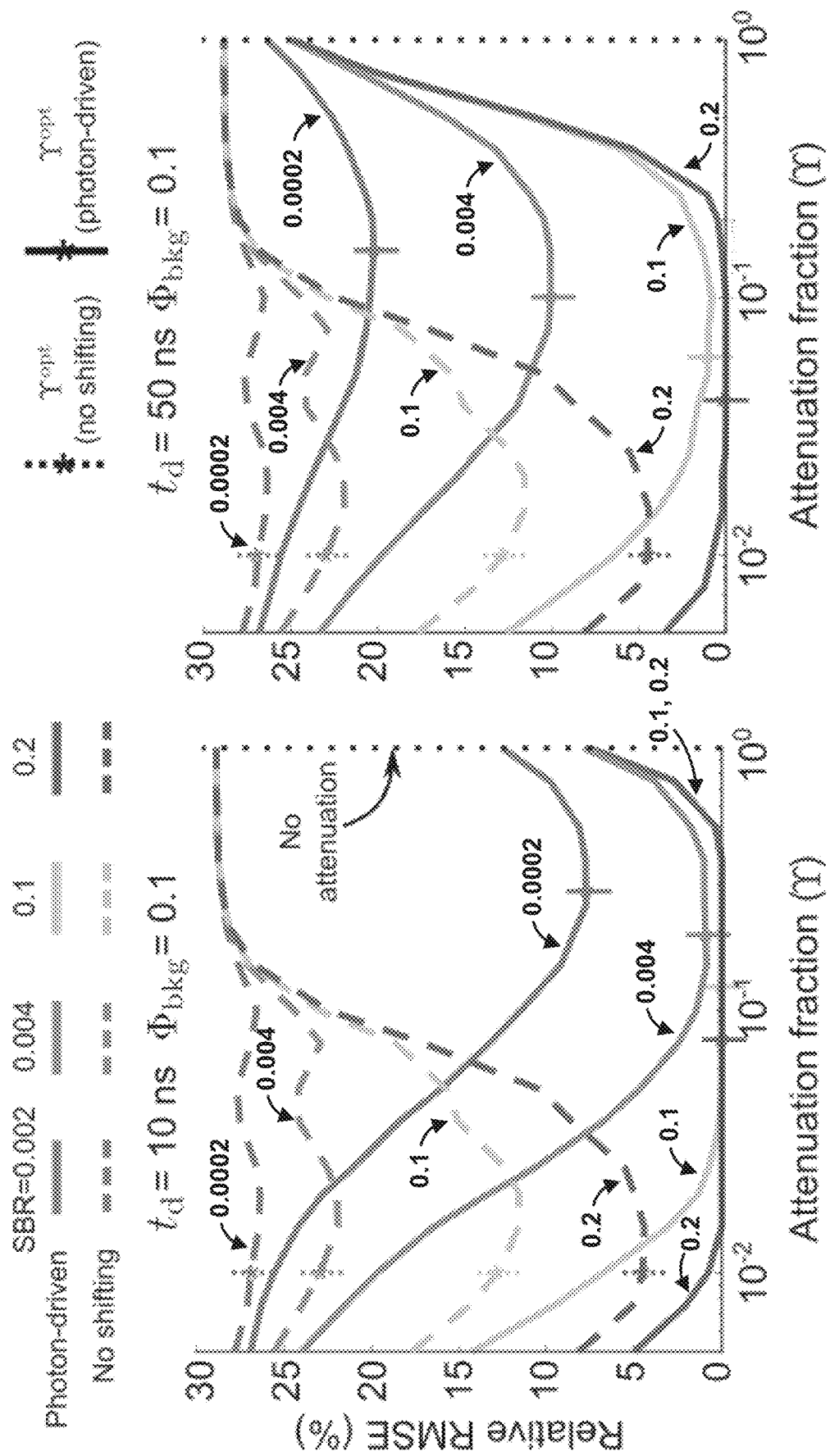
FIG. 15 shows examples of simulated relative depth errors for various light source signal intensities in the presence of ambient light as a function of attenuation factor with different dead times $t_d$ after each photon detection in both an asynchronous SPAD-based pulsed LiDAR with photon-driven shifting and a synchronous SPAD-based pulsed LiDAR.

FIG. 15 shows examples of simulated relative depth errors for various light source signal intensities in the presence of ambient light as a function of attenuation factor with different dead times $t_d$ after each photon detection in both an asynchronous SPAD-based pulsed LiDAR with photon-driven shifting and a synchronous SPAD-based pulsed LiDAR. Note that in FIG. 15 the background intensity is held constant, and consequently the signal intensity can be determined based on the SBR and background intensity using the following expression $\Phi_{sig}=SBR/B*\Phi_{bkg}$. The simulation results show depth RMSE for the conventional synchronous mode and photon-driven shifting over a range of attenuation factors and two different dead times. Note that the locations of the plotted minima agree with the optimal photon-driven attenuation described above in connection with FIG. 10. It can be observed from FIG. 15 that the optimal attenuation fraction with shifting is much higher (corresponding to much less attenuation) than that for conventional synchronous acquisition. Additionally, combining attenuation with photon-driven shifting can provide a large gain in depth error performance, reducing the RMSE to almost zero for some combinations of SBR and dead time.

Figure 16:
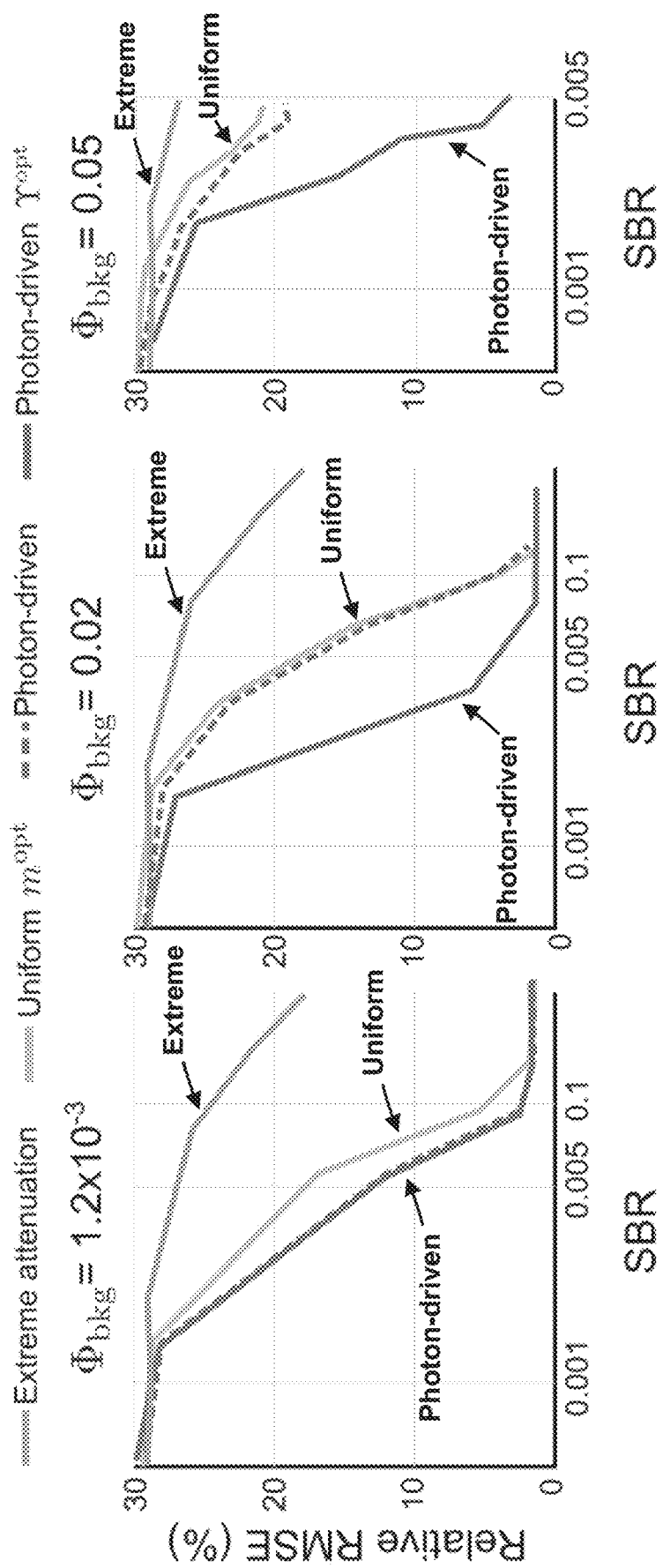
FIG. 16 shows examples of simulated relative depth errors for synchronous SPAD-based pulsed LiDAR with extreme attenuation, asynchronous SPAD-based pulsed LiDAR with uniform shifting and no attenuation and optimal SPAD active time, asynchronous SPAD-based pulsed LiDAR with photon-driven shifting and no attenuation, and asynchronous SPAD-based pulsed LiDAR with photon-driven shifting and optimal attenuation as a function of signal-to-background ratio.

FIG. 16 shows examples of simulated relative depth errors for synchronous SPAD-based pulsed LiDAR with extreme attenuation, asynchronous SPAD-based pulsed LiDAR with uniform shifting and no attenuation and optimal SPAD active time, asynchronous SPAD-based pulsed LiDAR with photon-driven shifting and no attenuation, and asynchronous SPAD-based pulsed LiDAR with photon-driven shifting and optimal attenuation as a function of signal-to-background ratio. The depth RMSE at three different ambient flux levels shown in FIG. 16 for a range of SBR values. As can be appreciated from FIG. 16, a combination of photon-driven shifting with optimal attenuation provides the generally best performance of all the techniques that were simulated. For high ambient flux levels, even at high SBR, the conventional 5% rule-of-thumb (i.e., extreme attenuation) and shifting alone (both uniform and photon-driven without optimal attenuation) failed to provide acceptable depth reconstruction performance. This suggests that the optimal acquisition strategy for SPAD-based LiDAR in many cases may be a combination of shifting and attenuation.

Figure 17A:
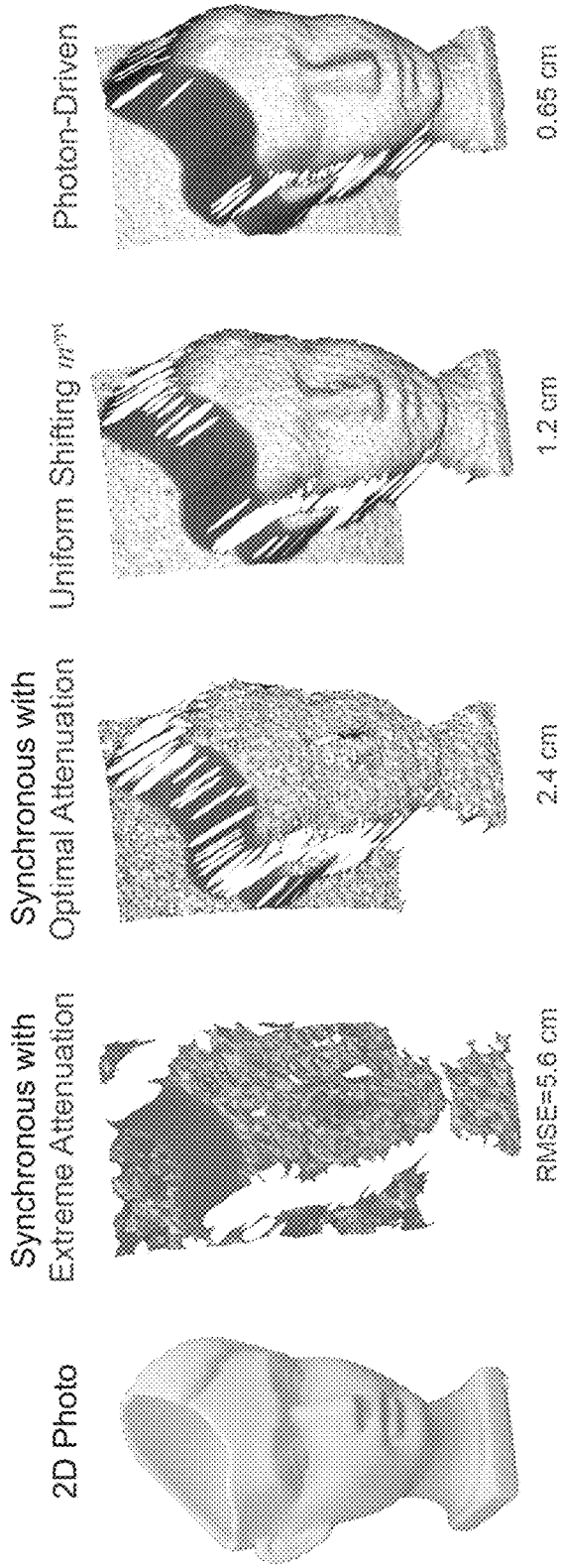
FIG. 17A shows an example of a two-dimensional depiction of a scene including a sculpture, and various surfaces based on depth information generated by different synchronous SPAD-based pulsed LiDAR systems, and asynchronous SPAD-based pulsed LiDAR systems implemented in accordance with some embodiments of the disclosed subject matter.

FIG. 17A shows an example of a two-dimensional depiction of a scene including a sculpture, and various surfaces based on depth information generated by different synchronous SPAD-based pulsed LiDAR systems, and asynchronous SPAD-based pulsed LiDAR systems implemented in accordance with some embodiments of the disclosed subject matter. In particular, various 3D reconstructions of a "PorcelainFace" scene under high ambient illumination (~11 ambient photons per bin, with a pulsed laser at an SBR of 00.2) are shown in FIG. 17A. Note that both uniform and photon-driven shifting (with the optimal attenuation determined as described above in connection with FIG. 10 to be $Y_{photo-driven}^{opt}=1$, e.g., indicating that although background flux was relatively high, it was not high enough to require additional attenuation, and using a shifting scheme was sufficient to mitigate pileup) perform better than synchronous acquisition techniques. As shown, the photon-driven acquisition scheme achieved subcentimeter RMSE, which is an order of magnitude better than the state-of-the-art extreme attenuation technique.

Figure 17B:
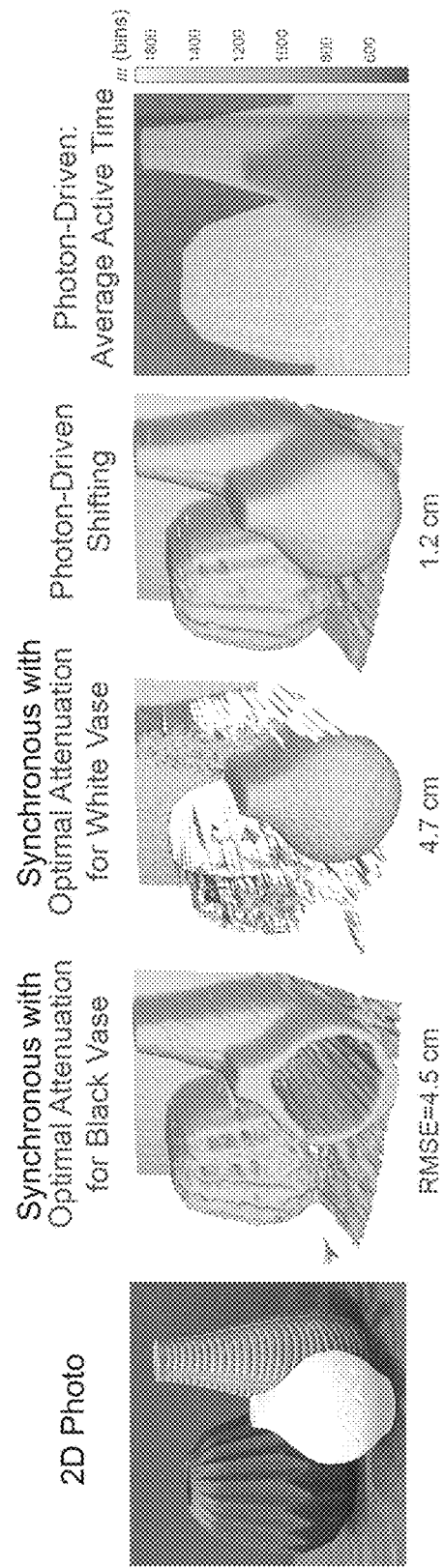
FIG. 17B shows an example of a two-dimensional depiction of a scene including three different vases having different properties, and various surfaces based on depth information generated by a synchronous SPAD-based pulsed LiDAR system with different attenuation values, and an asynchronous SPAD-based pulsed LiDAR system with uniform shifting implemented in accordance with some embodiments of the disclosed subject matter, and the average number of time bins that the SPAD was active before a photon detection for each point in the scene.

FIG. 17B shows an example of a two-dimensional depiction of a scene including three different vases having different properties, and various surfaces based on depth information generated by a synchronous SPAD-based pulsed LiDAR system with different attenuation values, and an asynchronous SPAD-based pulsed LiDAR system with uniform shifting implemented in accordance with some embodiments of the disclosed subject matter, and the average number of time bins that the SPAD was active before a photon detection for each point in the scene. Note that the number of bins B being held constant across laser cycles at B=1000 for each test.

Note that the synchronous techniques with optimal attenuation relied on setting an attenuation factor for different parts of the scene based on the total photon flux and hence requires explicit pixel-wise adaptation. The "Vases" scene depicted in FIG. 17B includes a black vase with a much lower albedo than the white vase, as well a third vase with an intermediate albedo. The optimal attenuation fraction used by the synchronous scheme to capture depth information about the white vase is too low for the black vase, causing it to appear noisy. Similarly, optimal attenuation fraction used by the synchronous scheme to capture depth information about the black vase is too high to avoid pileup distortions at the white vase. Photon-driven shifting (with the optimal attenuation calculated as described above in connection with FIG. 10 to be $Y_{photo-driven}^{opt}=1$) automatically adapted to different photon flux levels and reliably captured the depth map for both vases. Observe that the average active time automatically adapted to the flux at each pixel. For darker scene points it was longer than the laser cycle period in the synchronous scheme of B=1000.

FIG. 18 shows an example of simulated relative depth errors for various combinations of light source signal intensity and acquisition time for an asynchronous SPAD-based pulsed LiDAR system with photon-driven shifting implemented in accordance with some embodiments of the disclosed subject matter. As shown in FIG. 18, depth error performance is plotted as the number of laser cycles decreases, while keeping the $\Phi_{sig}T$ product is kept constant. Note that the product is given in units of microseconds (μs) because $\Phi_{sig}$ is essentially a unitless value. Accordingly, as the acquisition time on the x-axis decreases, it corresponds to a rise in signal level $\Phi_{sig}$ sufficient to keep the product constant. For all $\Phi_{sig}$ levels, RMSE curves have flat valleys, with errors starting to rise beyond a certain T and reaching the maximum possible error eventually. Note that the transition from the valley to max error for different $\Phi_{sig}$ levels appears to happen at a lower acquisition time as $\Phi_{sig}$ increases until T becomes less than about two laser cycles. Beyond this, the error cannot be reduced no matter how high $\Phi_{sig}$ is made.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the process of FIGS. 8-10 can be executed or performed in any order or sequence not limited to the order and sequence shown and described in the figures. Also, some of the above steps of the processes of FIGS. 8-10 can be executed or performed substantially simultaneously where appropriate or in parallel to reduce latency and processing times.

Appendix A include further explanations, examples, and results related to the disclosed subject matter, and is hereby incorporated by reference herein in its entirety.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for determining depths, comprising:
   a light source;
   a detector configured to detect arrival of individual photons, and in response to a photon detection event, enter a dead time during which the detector is inhibited from detecting arrival of photons;
   at least one processor that is programmed to:
      cause the light source to emit a plurality of pulses of light toward a scene point at a plurality of regular time intervals each corresponding to one of a plurality of light source cycles, each light source cycle corresponds to B time bins;
      cause the detector to enter, at a first time corresponding to a time bin j where 1≤j≤B, a first acquisition window during which the detector is configured to detect arrival of individual photons;
      cause the detector to enter, at a second time corresponding to a time bin k where 1≤k≤B and k≠j, a second acquisition window during which the detector is configured to detect arrival of individual photons;
      record a multiplicity of photon arrival times determined using the detector;
      associate each of the multiplicity of photon arrival times with a time bin i where 1≤i≤B; and
      estimate a depth of the scene point based on
         a number of photon detection events at each time bin, and
         a denominator corresponding to each time bin.

2. The system of claim 1, wherein the first acquisition window corresponds to m time bins and the second acquisition window corresponds to m time bins.

3. The system of claim 2, wherein the at least one processor is further programmed to:
   determine an ambient light intensity associated with the scene point; and
   determine m based at least in part on the ambient light intensity associated with the scene point, a time budget T for acquisition at the scene point, and the dead time.

4. The system of claim 3, wherein the at least one processor is further programmed to:
   select m such that $$\frac{T}{m\Delta + t_d} \frac{1 - e^{-m\Phi_{bkg}}}{1 - e^{-\Phi_{bkg}}}$$

is maximized, where $t_d$ is the dead time, $\Phi_{bkg}$ represents the ambient light intensity, and $\Delta$ is a bin size.

5. The system of claim 3, further comprising an attenuation element configured to provide a variable intensity attenuation factor, wherein an intensity of light perceived by the detector corresponds to a product of the attenuation factor and an intensity of light perceived by the detector in the absence of attenuation by the attenuation element,
   wherein the at least one processor is further programmed to:
   determine an ambient light intensity associated with the scene point; and
   select an attenuation factor Y and select m such that $$\underset{m,Y}{\operatorname{argmax}} \frac{T}{(m\Delta + t_d)} \frac{\left(1 - e^{-Ym\Phi_{bkg}}\right)\left(1 - e^{-Y\Phi_{sig}}\right)}{e^{Y\Phi_{bkg}} - 1}$$

is maximized, where $t_d$ is the dead time, $\Phi_{bkg}$ represents the ambient light intensity, and $\Delta$ is a bin size.

6. The system of claim 2, wherein the first acquisition window begins at a point that is synchronized with a first pulse corresponding to a first light source cycle of the plurality of light source cycles, and the first acquisition window corresponds to time bins i, $1 \leq i \leq B \ominus m$ where $\ominus$ represents subtraction modulo-B such that for $B < m < 2B$ the first acquisition window corresponds to the B time bins corresponding to a first light source cycle, and m−B time bins of a second light source cycle that immediately follows the first light source cycle),
   wherein the at least one processor is further programmed to:
   determine that the detector detected a photon within the first acquisition window;
   in response to determining that the detector detected a photon within the first acquisition window, inhibit the detector from detecting photons for any remaining time bins of the first acquisition window and a number of time bins substantially corresponding to the dead time that immediately following the first acquisition window substantially corresponding to the dead time.

7. The system of claim 2, wherein the at least one processor is further programmed to:
   determine, for each time bin i, a denominator $D_i$ where $0 \leq D_i \leq n$, where n is total number of light source cycles, based on the relationship $D_i = \sum_{l=1}^{L} D_{l,i}$ where l denotes a particular detector cycle of a plurality of detector cycles each comprising an acquisition window and time corresponding to the dead time, and L is the total number of detection cycles.

8. The system of claim 1, wherein the second time is randomly determined based on a time at which the detector detects a photon within the first acquisition window.

9. The system of claim 8, wherein the at least one processor is further programmed to:
   determine, for each time bin i, a denominator $D_i$ where $0 \leq D_i \leq n$, where n is total number of light source cycles, based on the relationship $$D_i = \frac{T}{B\Delta} - \sum_{j'=1}^{t_d/\Delta} N_{i \ominus j'},$$

where T is a time budget for acquisition at the scene point, $\Delta$ is a bin size, $t_d$ is the dead time, $N_i$ is the number of photon detections in time bin i, and j' is an index.

10. The system of claim 8, further comprising an attenuation element configured to provide a variable intensity attenuation factor, wherein an intensity of light perceived by the detector corresponds to a product of the attenuation factor and an intensity of light perceived by the detector in the absence of attenuation by the attenuation element,
    wherein the at least one processor is further programmed to:
    determine an ambient light intensity associated with the scene point; and
    select an attenuation factor Y that is expected to improve precision of the depth estimate based on the ambient light intensity, a value indicative of light source intensity received at the detector from the scene point, and the dead time.

11. The system of claim 10, wherein the at least one processor is further programmed to:
    select Y such that $$\frac{Te^{-Y\Phi_{bkg}}(1 - e^{-Y\Phi_{sig}})}{B(1 + (1 - e^{-Y\Phi_{bkg}})t_d)}$$

is maximized, where $t_d$ is the dead time, $\Phi_{bkg}$ represents the ambient light intensity, $\Phi_{sig}$ represents light source intensity received at the detector from the scene point, T is a time budget for acquisition at the scene point, and B is the number of time bins.

12. A method for determining depths, comprising:
    causing a light source to emit a plurality of pulses of light toward a scene point at a plurality of regular time intervals each corresponding to one of a plurality of light source cycles, each light source cycle corresponds to B time bins;
    causing a detector to enter, at a first time corresponding to a time bin j where $1 \leq j \leq B$, a first acquisition window during which the detector is configured to detect arrival of individual photons,
    wherein the detector is configured to detect arrival of individual photons, and in response to a photon detection event, enter a dead time during which the detector is inhibited from detecting arrival of photons;
    causing the detector to enter, at a second time corresponding to a time bin k where $1 \leq k \leq B$ and $k \neq j$, a second acquisition window during which the detector is configured to detect arrival of individual photons;

recording a multiplicity of photon arrival times determined using the detector;

associating each of the multiplicity of photon arrival times with a time bin i where $1 \leq i \leq B$; and estimating a depth of the scene point based on
a number of photon detection events at each time bin, and
a denominator corresponding to each time bin.

13. The method of claim 12, wherein the first acquisition window corresponds to m time bins and the second acquisition window corresponds to m time bins, the method further comprising:

determining an ambient light intensity associated with the scene point; and determining m based at least in part on the ambient light intensity associated with the scene point, a time budget T for acquisition at the scene point, and the dead time.

14. The method of claim 13, further comprising:
selecting m such that $$\frac{T}{m\Delta + t_d} \frac{1 - e^{-m\Phi_{bkg}}}{1 - e^{-\Phi_{bkg}}}$$

is maximized, where $t_d$ is the dead time, $\Phi_{bkg}$ represents the ambient light intensity, and $\Delta$ is a bin size.

15. The method of claim 13, further comprising:
determining an ambient light intensity associated with the scene point; and
selecting an attenuation factor Y and select m such that $$\underset{m,Y}{\mathrm{argmax}} \frac{T}{(m\Delta + t_d)} \frac{\left(1 - e^{-Ym\Phi_{bkg}}\right)(1 - e^{-Y\Phi_{sig}})}{e^{Y\Phi_{bkg}} - 1}$$

is maximized, where $t_d$ is the dead time, $\Phi_{bkg}$ represents the ambient light intensity, and $\Delta$ is a bin size.

16. The method of claim 13, further comprising:
determining, for each time bin i, a denominator $D_i$ where $0 \leq D_i \leq n$, where n is total number of light source cycles, based on the relationship $D_i = \Sigma_{l=1}^{L} D_{l,i}$ where l denotes a particular detector cycle of a plurality of detector cycles each comprising an acquisition window and time corresponding to the dead time, and L is the total number of detection cycles.

17. The method of claim 12, wherein the second time is randomly determined based on a time at which the detector detects a photon within the first acquisition window.

18. The method of claim 17, further comprising:
determining, for each time bin i, a denominator $D_i$ where $0 \leq D_i \leq n$, where n is total number of light source cycles, based on the relationship $$D_i = \frac{T}{B\Delta} - \sum_{j'=1}^{t_d/\Delta} N_{i \ominus j'},$$

where T is a time budget for acquisition at the scene point, $\Delta$ is a bin size, $t_d$ is the dead time, $N_i$ is the number of photon detections in time bin i, and j' is an index.

19. The method of claim 17, further comprising:
determining an ambient light intensity associated with the scene point;

selecting an attenuation factor Y that is expected to improve precision of the depth estimate based on the ambient light intensity, a value indicative of light source intensity received at the detector from the scene point, and the dead time; and wherein the multiplicity of photon arrival times detected by the detector are detected during a period of time during which light incident on the detector is attenuated by an attenuation element configured to provide the selected attenuation factor, wherein an intensity of light perceived by the detector corresponds to a product of the attenuation factor and an intensity of light perceived by the detector in the absence of attenuation by the attenuation element.

20. The method of claim 19, wherein selecting the attenuation factor further comprises selecting Y such that $$\frac{Te^{-Y\Phi_{bkg}}(1 - e^{-Y\Phi_{sig}})}{B\left(1 + \left(1 - e^{-Y\Phi_{bkg}}\right)t_d\right)}$$

is maximized, where $t_d$ is the dead time, $\Phi_{bkg}$ represents the ambient light intensity, $\Phi_{sig}$ represents light source intensity received at the detector from the scene point, T is a time budget for acquisition at the scene point, and B is the number of time bins.

21. A non-transitory computer readable medium containing computer executable instructions that, when executed by a processor, cause the processor to perform a method for determining depths, comprising:

causing a light source to emit a plurality of pulses of light toward a scene point at a plurality of regular time intervals each corresponding to one of a plurality of light source cycles, each light source cycle corresponds to B time bins;

causing a detector to enter, at a first time corresponding to a time bin j where $1 \leq j \leq B$, a first acquisition window during which the detector is configured to detect arrival of individual photons, wherein the detector is configured to detect arrival of individual photons, and in response to a photon detection event, enter a dead time during which the detector is inhibited from detecting arrival of photons;

causing the detector to enter, at a second time corresponding to a time bin k where $1 \leq k \leq B$ and $k \neq j$, a second acquisition window during which the detector is configured to detect arrival of individual photons;

recording a multiplicity of photon arrival times determined using the detector;

associating each of the multiplicity of photon arrival times with a time bin i where $1 \leq i \leq B$; and estimating a depth of the scene point based on
a number of photon detection events at each time bin, and
a denominator corresponding to each time bin.

* * * * *

UNITED STATES PATENT AND TRADEMARK OFFICE
CERTIFICATE OF CORRECTION

PATENT NO. : 11,448,767 B2
APPLICATION NO. : 16/434611
DATED : September 20, 2022
INVENTOR(S) : Mohit Gupta et al.

It is certified that error appears in the above-identified patent and that said Letters Patent is hereby corrected as shown below:

In the Specification

Column 5, Line 33, "bin where" should be --bin i where--.

Column 10, Line 5, "$\tau = 2d/c$" should be --$\bar{\tau} = 2d / c$--.

Column 29, Eq. (15). "$\ell[D_i] = T / (B(1 + (1 - e^{-Y\Phi_{bkg}})t_d))$" should be --$\mathbb{E}[D_i] = T / (B(1 + (1 - e^{-Y\Phi_{bkg}})t_d))$--.

Signed and Sealed this
Fifteenth Day of November, 2022

*Katherine Kelly Vidal*
Katherine Kelly Vidal
*Director of the United States Patent and Trademark Office*